(12) United States Patent
Jung et al.

(10) Patent No.: US 9,698,856 B2
(45) Date of Patent: Jul. 4, 2017

(54) ELECTRONIC DEVICE WITH RADIO FUNCTION AND OPERATING METHOD THEREOF

(71) Applicant: Samsung Electronics Co., Ltd., Gyeonggi-do (KR)

(72) Inventors: Hoonsoub Jung, Gyeongsangbuk-do (KR); Jeongwook Seo, Daegu (KR); Yonggil Han, Gyeongsangbuk-do (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 234 days.

(21) Appl. No.: 14/341,671

(22) Filed: Jul. 25, 2014

(65) Prior Publication Data
US 2015/0031411 A1 Jan. 29, 2015

(30) Foreign Application Priority Data
Jul. 26, 2013 (KR) .................. 10-2013-0088377

(51) Int. Cl.
*H04M 1/00* (2006.01)
*H04B 1/401* (2015.01)
*H04B 1/403* (2015.01)

(52) U.S. Cl.
CPC ............. *H04B 1/401* (2013.01); *H04B 1/406* (2013.01)

(58) Field of Classification Search
CPC ...................................... H04B 1/401
See application file for complete search history.

(56) References Cited

U.S. PATENT DOCUMENTS

| 2008/0167033 | A1* | 7/2008 | Beckers ............... H04L 12/66 455/432.3 |
| 2008/0300007 | A1* | 12/2008 | Kim ..................... H04W 48/18 455/552.1 |
| 2013/0102313 | A1* | 4/2013 | Tinnakornsrisuphap H04W 36/22 455/436 |

* cited by examiner

*Primary Examiner* — Justin Lee

(57) ABSTRACT

A method and a device for selecting a radio in an electronic device with a hybrid radio function. The method includes detecting an entrance to a hybrid radio function; determining a default radio mode to be executed as a default in response to a preconfigured mode determination condition; and receiving and reproducing a radio broadcast in a radio mode corresponding to the determined default radio mode. The present disclosure can be applied to various other embodiments based on the aforementioned embodiment.

14 Claims, 19 Drawing Sheets

ELECTRONIC DEVICE WITH RADIO FUNCTION AND OPERATING METHOD THEREOF

CROSS-REFERENCE TO RELATED APPLICATION(S) AND CLAIM OF PRIORITY

The present application is related to and claims priority from and the benefit under 35 U.S.C. §119(a) of Korean Patent No. 10-2013-0088377, filed on Jul. 26, 2013, which is hereby incorporated by reference for all purposes as if fully set forth herein.

TECHNICAL FIELD

The present disclosure relates to an electronic device with a radio function and an operating method thereof, and more particularly, to a method and a device for automatically selecting a radio mode in an electronic device with a radio function.

BACKGROUND

Recently, with the development of digital technologies, various electronic devices (e.g., a mobile communication terminal, a Personal Digital Assistant (PDA), an electronic organizer, a smart phone, a tablet Personal Computer (PC), a media player (e.g., an MP3 player), and the like) which can perform communication and personal information processing have come to market. The electronic devices have reached a mobile convergence stage of encompassing an area of other terminals without being confined to their own traditional unique areas. For example, the electronic devices may be provided with various functions including a call function such as a voice call and a video call, a message transmission/reception function such as a Short Message Service (SMS), a Multimedia Message Service (MMS), and an email, a navigation function, a photography function, a broadcast reproduction function, a media (a video and music) reproduction function, an internet function, a messenger function, a Social Networking Service (SNS) function, and the like.

Furthermore, the electronic devices provide a broadcast reproduction function capable of receiving and reproducing various broadcasts (for example, a Digital Multimedia Broadcast (DMB) (e.g., a satellite broadcast, a terrestrial broadcast, and the like), an analog radio broadcast, a digital radio broadcast).

In particular, the electronic devices recently provide a hybrid radio function. The hybrid radio function represents a technology using both an analog radio and a digital radio. When executing the hybrid radio function, the electronic devices can perform an operation of receiving an analog radio broadcast in an analog mode (analog radio domain) and an operation of receiving a digital radio broadcast in a digital mode (digital radio domain).

In general, the electronic devices with the hybrid radio function can receive a corresponding radio broadcast in a preconfigured specific mode when the hybrid radio function is executed.

For example, in a case where the preconfigured specific mode is the analog mode, when executing the hybrid radio function, the electronic device unconditionally executes the analog mode as a default and accordingly, may receive and reproduce the analog radio broadcast. Thus, a user has to directly switch the mode whenever using the digital radio broadcast in the digital mode. Similarly, in a case where the preconfigured specific mode is the digital mode, when executing the hybrid radio function, the electronic device unconditionally executes the digital mode as the default and accordingly, may receive and reproduce the digital radio broadcast. Thus, the user has to directly switch the mode whenever using the analog radio broadcast in the analog mode.

That is, the user always has to directly change the mode in order to use a radio broadcast in a mode which the user wants to use or a mode suitable for the user characteristic.

SUMMARY

To address the above-discussed deficiencies, it is a primary object to provide a method and a device for operating a radio function in an electronic device which can more effectively provide the radio function in the electronic device.

In embodiments of the present disclosure, the electronic device may include all devices using one or more of an Application Processor (AP), a Graphic Processing unit (GPU), and a Central Processing Unit (CPU), such as all information communication devices, all multimedia devices, all wearable devices, and all application devices thereof, which support functions according to the various embodiments of the present disclosure.

Another aspect of the present disclosure is to provide a method and a device for operating a radio function in an electronic device which can provide, as a default, a radio broadcast of a radio mode corresponding to a user characteristic (a mode determination condition) when the electronic device with the radio function executes a hybrid radio function.

Another aspect of the present disclosure is to provide a method and a device for operating a radio function in an electronic device which can adaptively select a specific radio mode which will be executed as a default according to a user characteristic (a mode determination condition) when the electronic device with the radio function executes a hybrid radio function capable of using both an analog mode and a digital mode.

Another aspect of the present disclosure is to provide a method and a device for operating a radio function in an electronic device which can implement an optimal environment for an operation of a hybrid radio function in the electronic device, thereby improving user convenience and usability of the electronic device.

In accordance with one aspect of the present disclosure, a method of operating a hybrid radio in an electronic device is provided. The method includes: detecting an entrance to a hybrid radio function; determining a default radio mode to be executed as a default in response to a preconfigured mode determination condition; and receiving and reproducing a radio broadcast in a radio mode corresponding to the determined default radio mode.

In accordance with another aspect of the present disclosure, a computer readable recording medium in which programs for executing the method in a processor are recorded is provided.

The recording medium may include a computer readable recording medium storing programs for performing an operation of detecting an entrance to a hybrid radio function, an operation of identifying a preconfigured mode determination condition, an operation of determining a default radio mode to be executed as a default in response to the mode determination condition, and an operation of receiving and reproducing a radio broadcast in a radio mode corresponding to the determined default radio mode.

In accordance with another aspect of the present disclosure, an electronic device includes: a touch screen that receives a user input for an entrance of the electronic device to a hybrid radio function and displays a screen corresponding to a default radio mode when the electronic device enters the hybrid radio function; and a controller that determines the default radio mode to be executed as a default in response to a preconfigured mode determination condition when the electronic device enters the hybrid radio function and controls an operation of the hybrid radio function in a radio mode corresponding to the determined default radio mode.

The electronic device may further include a storage unit that stores the mode determination condition configured by a user; and a broadcast receiving module that supports the hybrid radio function. The broadcast receiving module may include a digital broadcast receiving module that receives a digital radio broadcast according to a digital mode; an analog broadcast receiving module that receives an analog radio broadcast according to an analog mode; and a broadcast switching module that switches between the digital mode and the analog mode.

In the above mentioned aspects, the features and technical merits of the present disclosure are slightly widely summarized in order that those skilled in the art may understand the present disclosure through the detailed description of the present disclosure later. The additional features and advantages of the present disclosure constituting the subject matter of the present disclosure described in the claims as well as these features and advantages will be understood well through the detailed description of the present disclosure described later.

As described above, according to the electronic device with the radio function and the operating method thereof which are proposed in the embodiments of the present disclosure, the electronic device with the hybrid radio function capable of receiving and reproducing both the analog radio broadcast and the digital radio broadcast can more intuitively and effectively provide the hybrid radio function. An optimal mode of the radio broadcast, which will be received from the broadcast server and will be reproduced when the hybrid radio application is executed, is automatically selected based on the user characteristic (the mode determination condition) so that the radio broadcast of the corresponding mode can be received and reproduced.

When a hybrid radio application is executed by a user, a default mode can be automatically selected from two modes (an analog mode and a digital mode) by a most realistic and efficient method from a point of view of the user. Accordingly, when using the hybrid radio function, the user may allow a radio broadcast (an analog radio broadcast or a digital radio broadcast) of the mode corresponding to the user characteristic (a mode determination condition) to be executed as a default, thereby enhancing usability of the hybrid radio function.

Thus, according to the embodiments of the present disclosure, an optimal environment can be implemented for operating the hybrid radio function in the electronic device, thereby improving user convenience, and usability, convenience, accessibility, and competitiveness of the electronic device. The present disclosure may be implemented by all types of user devices such as a mobile communication terminal, a smart phone, a tablet PC, a PDA, a wearable device, and the like, and various devices capable of supporting the hybrid radio function according to the various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
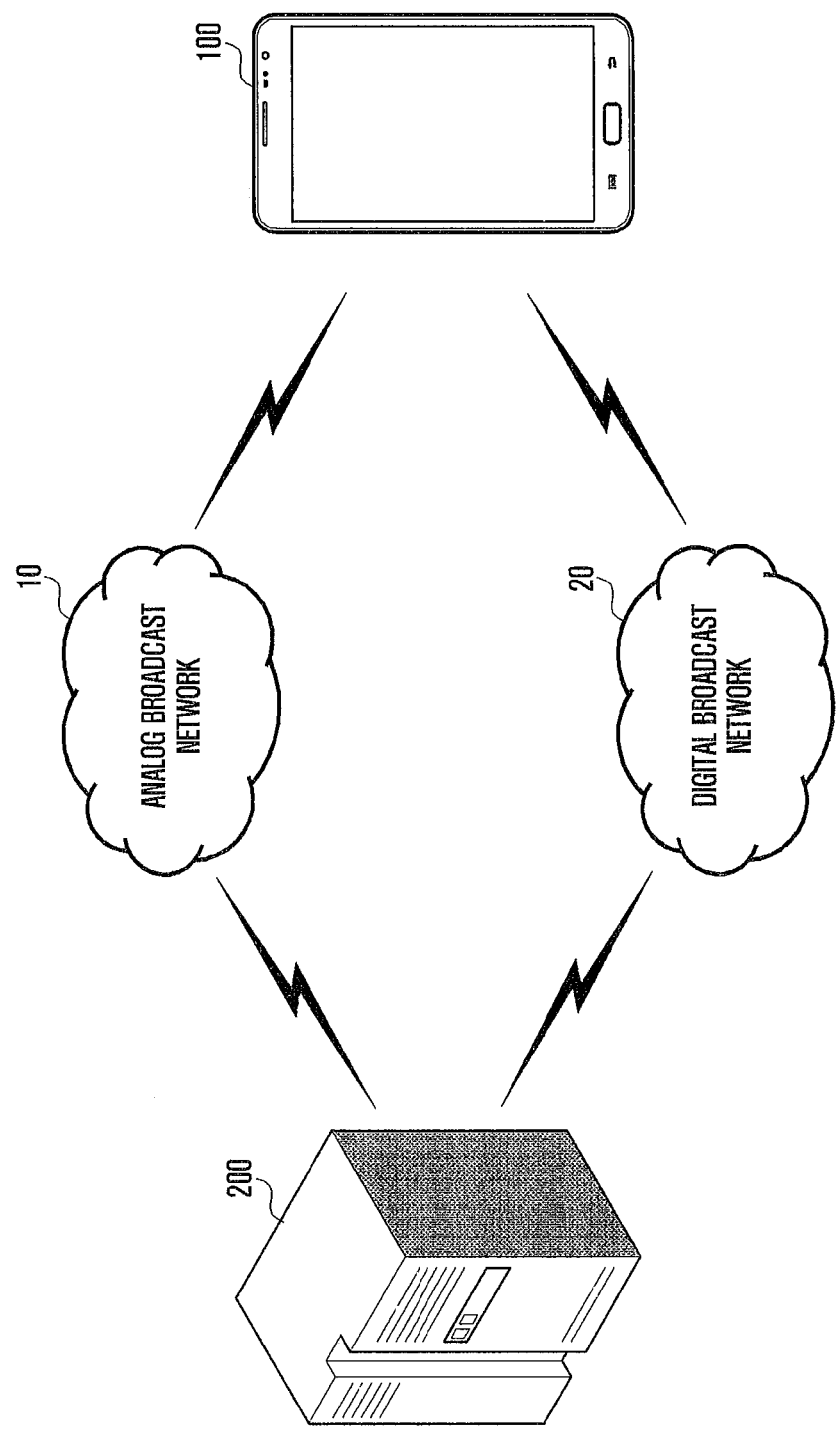
FIG. 1 schematically illustrates configurations of a system according to an embodiment of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, various embodiments of the present disclosure will be described in detail with reference to the accompanying drawings. It should be noted that the same elements will be designated by the same reference numerals although they are shown in different drawings. Further, detailed descriptions related to well-known functions or configurations capable of making subject matters of the present disclosure unnecessarily obscure will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

The proposed present disclosure relates to a method and a device for selecting a radio in an electronic device with a hybrid radio function. In the embodiments of the present disclosure, a hybrid radio may be used as a term representing technologies of using both an analog radio and a digital radio. When executing the hybrid radio function, the electronic device with the hybrid radio function may perform an operation of receiving an analog radio broadcast in an analog mode (analog radio domain) and an operation of receiving a digital radio broadcast in a digital mode (digital radio domain).

In the embodiments of the present disclosure, when the hybrid radio function is executed in the electronic device, the most suitable radio mode among the analog mode and the digital mode may be automatically selected as a default mode depending on a user characteristic (e.g., a mode determination condition). In the embodiments of the present disclosure, the default mode for operating the hybrid radio mode function is automatically selected in view of the user characteristic, and the radio broadcast is provided in the selected mode, thereby increasing usability and accessibility of a user for the hybrid radio function.

Hereinafter, configurations of an electronic device according to an embodiment of the present disclosure and an operating method thereof will be described with reference to the accompanying drawings. The configurations of the electronic device according to the embodiment of the present disclosure and the operating method thereof are not restricted by or limited to contents which will be described below and therefore, it should be noted that they may be applied to various embodiments based on the embodiments which will be described below.

FIG. 1 schematically illustrates configurations of a system according to an embodiment of the present disclosure.

Referring to FIG. 1, the system according to the embodiment of the present disclosure may include an electronic device 100 and a broadcast server 200.

In the embodiment of the present disclosure, the broadcast server 200 may simultaneously transmit an analog radio broadcast and a digital radio broadcast. The broadcast server 200 may transfer the analog radio broadcast to the electronic device 100 through an analog broadcast network 10 and the digital radio broadcast to the electronic device 100 through a digital broadcast network 20.

In the embodiment of the present disclosure, the electronic device 100 may support the hybrid radio function, and may receive and reproduce both the analog radio and the digital radio. The electronic device 100 may include a digital broadcast receiving module and an analog broadcast receiving module to support the hybrid radio function. The electronic device 100 may receive the digital radio broadcast, which is transferred from the broadcast server 200 through the digital broadcast network 20, using the digital broadcast receiving module, and may receive the analog radio broadcast, which is transferred from the broadcast server 200 through the analog broadcast network 10, using the analog broadcast receiving module.

Furthermore, when operating the hybrid radio function, the electronic device 100 may determine a specific mode to execute as a default mode depending on a user characteristic (a mode determination condition), among the analog mode for the analog radio broadcast and the digital mode for the digital radio broadcast. In addition, the electronic device 100 may operate to receive the corresponding radio broadcast through the digital broadcast receiving module or the analog broadcast receiving module depending on the mode determined as the default mode and to reproduce the corresponding radio broadcast.

Moreover, while receiving and reproducing the radio broadcast by the analog or digital mode, the electronic device 100 may change the currently running mode to another mode in response to a change in the user characteristic (the mode determination condition) or a user's request, and may then receive and reproduce the corresponding radio broadcast. That is, the electronic device 100 may adaptively perform reception switching between the analog radio broadcast and the digital radio broadcast in response to a request for the reception switching between the analog radio broadcast and the digital radio broadcast.

Figure 2:
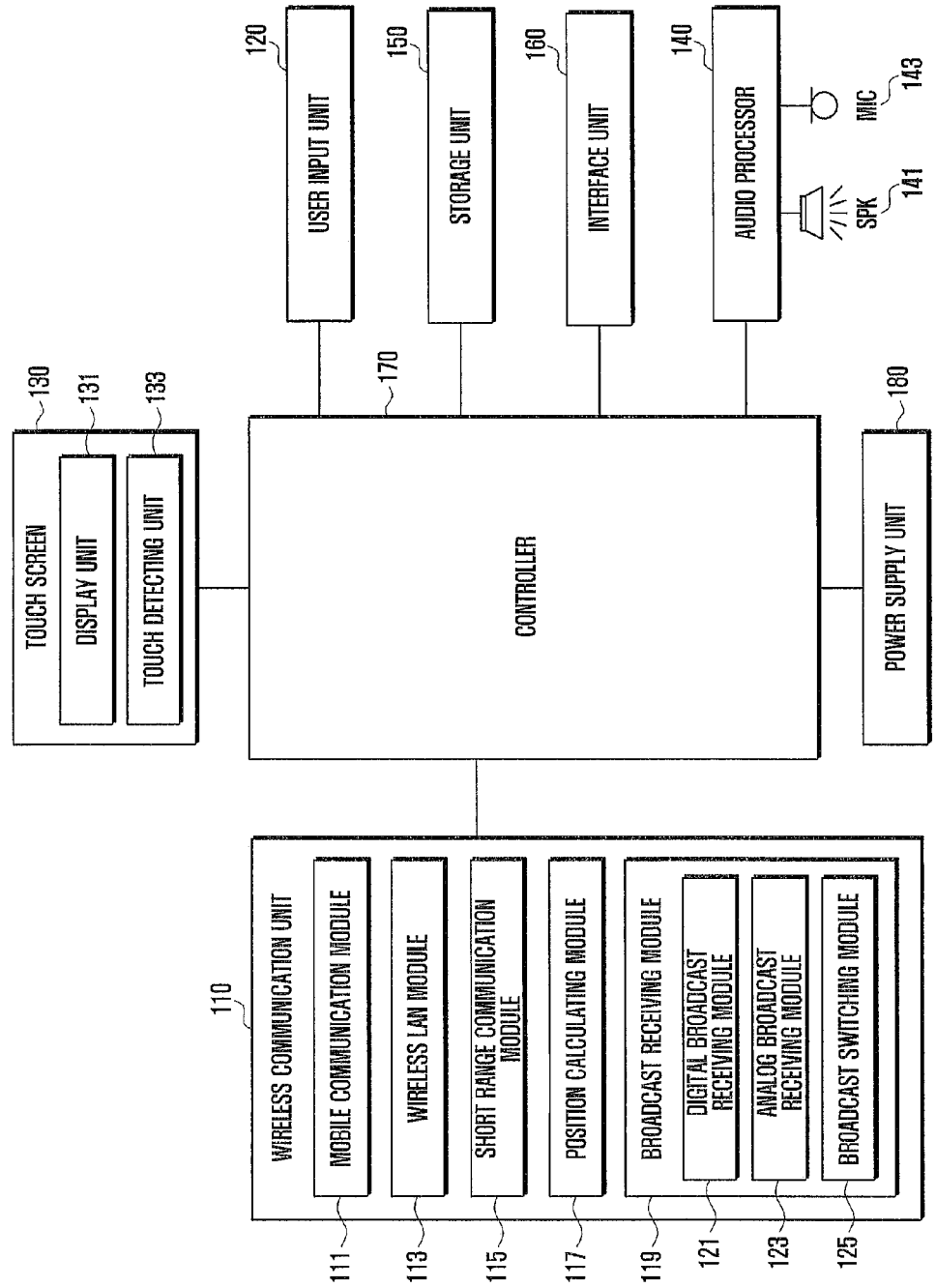
FIG. 2 is a block diagram schematically illustrating configurations of an electronic device according to an embodiment of the present disclosure.

FIG. 2 is a block diagram schematically illustrating configurations of an electronic device 100 according to an embodiment of the present disclosure.

Referring to FIG. 2, the electronic device 100 of the present disclosure may include a wireless communication unit 110, a user input unit 120, a touch screen 130, an audio processor 140, a storage unit 150, an interface unit 160, a controller 170, and a power supply unit 180. In the embodiment of the present disclosure, not all elements illustrated in FIG. 2 are indispensable and thus, the electronic device 100 may be implemented with more or fewer elements than illustrated in FIG. 2. For example, when the electronic device 100 according to the embodiment of the present disclosure supports a photography function, the electronic device 100 may further include a camera module. Furthermore, the electronic device 100 according to the embodiment of the present disclosure may further include an antenna which can receive an analog or digital broadcast. Moreover, when the electronic device 100 according to the embodiment of the present disclosure does not support a mobile communication service function, some modules (e.g., a mobile communication module 111 of the wireless communication unit 110) may be omitted.

The wireless communication unit 110 may include one or more modules enabling wireless communication between the electronic device 100 and a wireless communication system or between the electronic device 100 and another electronic device. For example, the wireless communication unit 110 may include a mobile communication module 111, a wireless Local Area Network (LAN) module 113, a short range communication module 115, a position calculating module 117, and a broadcast receiving module 119.

The mobile communication module 111 may transmit/receive a wireless signal to/from at least one of a base station, an external mobile station, and various servers (e.g., an integration server, a provider server, a content server, an internet server, a cloud server, and the like) on a mobile communication network. The wireless signal may include a voice call signal, a video call signal, or various types of data according to text/multimedia message transmission/reception.

The wireless LAN module 113 represents a module for establishing wireless internet access and a wireless LAN link with another electronic device, and may be embedded in or may be external to the electronic device 100. WLAN (Wi-Fi), Wireless broadband (Wibro), World Interoperability for Microwave Access (Wimax), High Speed Downlink Packet Access (HSDPA), or the like may be used as a wireless internet technology. The wireless LAN module 113 may transmit or receive various data (e.g., an image, a video, music, broadcast recording data, and the like) according to a user's selection to/from another electronic device when the wireless LAN link is established with the another electronic device. The wireless LAN module 113 may always be maintained in a turned-on status or may be turned on according to a user's configuration or input.

The short range communication module 115 represents a module for short range communication. Bluetooth, Bluetooth Low Energy (BLE), Radio Frequency Identification (RFID), Infrared Data Association (IrDA), Ultra Wideband (UWB), ZigBee, Near Field Communication (NFC), or the like may be used as a short range communication technology. Furthermore, the short range communication module 115 may transmit or receive data (e.g., an image, a video, music, broadcast recording data, and the like) according to a user's selection to/from another electronic device when short range communication is established with the another electronic device. The short range communication module 115 may always be maintained in a turned-on status or may be turned on according to a user's configuration or input.

The position calculating module 117 is a module for obtaining a position of the electronic device 100, and may include a Global Position System (GPS) module as a representative example. The position calculating module 117 may calculate three dimensional information on a current position according to a latitude, a longitude, and an altitude, by calculating information on a distance away from three or more base stations and accurate time information, and then applying trigonometry to the calculated information. Furthermore, the position calculating module 117 may calculate position information by continuously receiving position information of the electronic device 100 from three or more satellites in real time. The position information of the electronic device 100 may be obtained by various methods.

The broadcast receiving module 119 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast server through a broadcast channel (e.g., a satellite broadcast channel, a terrestrial broadcast channel, a radio broadcast channel, or the like).

In the embodiment of the present disclosure, the broadcast receiving module 119 may include a digital broadcast receiving module 121, an analog broadcast receiving module 123, and a broadcast switching module 125 for supporting a hybrid radio function. Here, according to the embodiment of the present disclosure, the digital broadcast receiving module 121 and the broadcast switching module 125 may be omitted in a method of receiving a digital radio broadcast through an internet network or a mobile communication network.

When the electronic device 100 operates in the digital mode while operating the hybrid radio function, the digital broadcast receiving module 121 may receive a digital broadcast signal provided through the digital broadcast network 20 among broadcast signals (e.g., an analog radio broadcast signal and a digital radio broadcast signal) transmitted by the broadcast server 200.

When the electronic device 100 operates in the analog mode while operating the hybrid radio function, the analog broadcast receiving module 123 may receive an analog broadcast signal provided through the analog broadcast network 10 among broadcast signals (e.g., an analog radio broadcast signal and a digital radio broadcast signal) transmitted by the broadcast server 200.

The broadcast switching module 125 may switch and configure a signal path for reception of the digital broadcast and the analog broadcast under the control of the controller 170. In the embodiment of the present disclosure, the broadcast switching module 125 may configure a signal path together with the digital broadcast receiving module 121 for reception of the digital radio broadcast under the control of the controller 170 when the electronic device 100 operates in the digital mode. Furthermore, the broadcast switching module 125 may configure a signal path together with the analog broadcast receiving module 123 for reception of the analog radio broadcast under the control of the controller 170 when the electronic device 100 operates in the analog mode. Moreover, the broadcast switching module 125 may switch and configure a signal path for reception switching between the analog radio broadcast signal and the digital radio broadcast signal in response to a mode switching request under the control of the controller 170 while the electronic device 100 is operating in the analog or digital mode.

The user input unit 120 may generate input data for controlling an operation of the electronic device 100 in response to a user input. The user input unit 120 may include a keypad, a dome switch, a touch pad (resistive type/capacitive type), a jog wheel, a jog switch, a sensor (e.g., a voice sensor, a proximity sensor, an illumination sensor, an acceleration sensor, a gyro sensor, a grip sensor, a pressure sensor, and the like), and the like. Furthermore, the user input unit 120 may be implemented in a button form on an outside of the electronic device 100, and some buttons may also be implemented on a touch panel. The user input unit 120 may receive a user input for executing the hybrid radio function, and may generate an input signal according to the received user input. Furthermore, while the hybrid radio function is being operated, the user input unit 120 may receive a user input for reception switching between the analog radio broadcast and the digital radio broadcast, namely, switching between the operation in the analog mode and the operation in the digital mode, and may generate an input signal according to the received user input.

The touch screen 130 is an input/output means for simultaneously performing an input function and a display function, and may include a display unit 131 and a touch detecting unit 133. The touch screen 130 may display, through the display unit 131, various screens (e.g., a standby screen, a messenger and a screen operated thereby, a screen for an outgoing call, a game screen, a gallery screen, a broadcast reproduction screen, a radio broadcast reproduction screen and the like) according to operations of the electronic device 100.

When a user input (e.g., a touch, a tap, a drag, a flick, a sweep, a hovering event, or the like) is detected by the touch detecting unit 133 while a specific screen is being displayed through the display unit 131, the touch screen 130 may transfer an input signal according to the user input to the controller 170. Then, the controller 170 may distinguish the user input and may control performance of a motion according to the user input. According to an embodiment, the touch screen 130 may receive a user input for channel switching, mode switching, or reproduction related function control (e.g., playback, pause, and stop) while displaying a reproduction screen according to the operation of the hybrid radio function, and may display a screen responding to the user input through the display unit 131 under the control of the controller 170.

The display unit 131 may display (output) information processed by the electronic device 100. For example, when the electronic device 100 is in a call mode, the display unit 131 may display a call related User Interface (UI) or Graphical User Interface (GUI). Furthermore, when the user device is in a video call mode or photography mode, the display unit 131 may display a photographed and/or received image, a UI, or a GUI. Furthermore, the display unit 131 may display a configuration menu screen for operating the hybrid radio function and an analog radio reproduction screen or digital radio reproduction screen corresponding to the operation of the hybrid radio function with the configured UI or GUI. Moreover, the display unit 131 may support a display in a landscape or portrait mode depending on an orientation of the electronic device 100 (or a direction in which the electronic device is placed) and a display switching depending on a change between the landscape and portrait modes.

The display unit 131 may include at least one of a Liquid Crystal Display (LCD), a Thin Film Transistor-LCD (TFT-LCD), a Light Emitting Diode (LED), an Organic LED (OLED), an Active Matrix OLED (AMOLED), a flexible display, a bended display, and a 3D display. Some of the displays may be implemented as a transparent display configured with a transparent or photo-transparent type such that the outside can be viewed there through.

The touch detecting unit 133 may be positioned on the display unit 131, and may detect a user's touch event (e.g., a tap, a drag, a sweep, a flick, a drag and drop, drawing, a single-touch, a multi-touch, a gesture (e.g., writing), or the like) on a surface of the touch screen 130 or a user's hovering event occurring in a space over the touch screen 130. When detecting the user's touch event or hovering event through the touch screen 130, the touch detecting unit 133 may detect coordinates where the touch event or hovering event is generated, and may transfer the detected coordinates to the controller 170. That is, the touch detecting unit 133 may detect the touch event or hovering event generated by the user and may generate a signal according to the detected touch event or hovering event to transmit the generated signal to the controller 170. The controller 170 may perform a function corresponding to an area where the touch event or hovering event is generated, by the signal transferred from the touch detecting unit 133.

The touch detecting unit 133 may receive a user input for execution of the hybrid radio function (application) (e.g., a selection of an icon on a menu screen for execution of the hybrid radio function), and may generate an input signal according to the received user input. The touch detecting unit 133 may receive a user input for configuring a user characteristic (a mode determination condition) on a configuration menu screen for operating the hybrid radio function, and may generate an input signal according to the received user input. Furthermore, the touch detecting unit 133 may receive a user input (e.g., channel switching and mode switching) and generate an input signal according to the received user input while an analog radio reproduction screen or a digital radio reproduction screen according to an operation of the hybrid radio function is displayed.

The touch detecting unit 133 may be configured to convert a change in a pressure applied to a specific portion of the display unit 131 or a change in an electrostatic capacity generated at a specific portion of the display unit 131 into an electric input signal. The touch detecting unit 133 may be configured to detect a touch pressure according to an applied touch method as well as a touched position and a touched area. When there is a touch input for the touch detection unit 133, a signal (signals) corresponding to the touch input may be transferred to a touch controller (not illustrated). The touch controller (not illustrated) may process the signal (signals), and then may transmit corresponding data to the controller 170. Hereby, the controller 170 may identify which area of the touch screen 130 is touched.

The audio processor 140 may transmit, to a speaker (SPK) 141, an audio signal input from the controller 170, and may perform a function of transferring an audio signal such as a voice input from a microphone (MIC) 143 to the controller 170. The audio processor 140 may convert voice/sound data into an audible sound to output the audible sound through the speaker 141 under the control of the controller 170, and may convert an audio signal such as a voice received from the microphone 143 into a digital signal to transfer the digital signal to the controller 170.

The speaker 141 may output audio data received from the wireless communication unit 110 or stored in the storage unit 150, in a broadcast reproduction mode, a radio broadcast reproduction mode, a messenger mode, a call mode, a message mode, a voice (video) recording mode, a voice recognition mode, and a media content (a music file and a video file) reproduction mode. The speaker 141 may also output sound signals related to functions performed by the electronic device 100 (e.g., functions such as a hybrid radio function, a messenger function, a function for receiving a conversation, a function for transmitting a conversation, a function for displaying a content image, a function for receiving a call connection, a function for transmitting a call connection, a photography function, a function of reproducing a media content file, and the like).

The microphone 143 may receive an external sound signal to process the external sound signal into an electric voice data in a messenger mode, a call mode, a message mode, a voice (video) recording mode, a voice recognition mode, and the like. In a case of a phone-call mode, the processed audio data may be converted into a format that can be transmitted to a mobile communication base station and then may be output through the mobile communication module 111. Various noise removal algorithms for removing noise generated in a process of receiving an external sound signal may be implemented for the microphone 143.

The storage unit 150 may store programs for processing and control of the controller 170, and may perform a function of storing input/output data (e.g., broadcast data, radio broadcast data, messenger data, a content image, contact information, a message, media content (e.g., an audio, a video, and an image), and the like). The storage unit 150 may store a usage frequency (e.g., a usage frequency of an application, a usage frequency of a broad channel, a usage frequency of a radio mode, a usage frequency of content, and the like), an importance value, and a priority according to operating functions of the electronic device 100. The storage unit 150 may also store various patterns of vibration data and sound data output in response to a touch input on the touch screen 130.

In the embodiment of the present disclosure, the storage unit 150 may store various pieces of operating information configured in advance by a user for operating the hybrid radio function. In the present disclosure, the operating information may include information configured as a user characteristic (i.e., a condition for determining a mode) with a priority for automatically selecting a default radio mode according to execution of the hybrid radio function. In the embodiment of the present disclosure, the user characteristic may represent at least one condition capable of determining the default mode, and a method may be configured for determining at least one of a presence or absence of earphones, incurring or not of an additional charge, an amount of used data, a mode usage pattern, a user's selection, and a user's configuration.

The storage unit 150 may continuously or temporarily store an Operating System (OS) of the electronic device 100, programs related to input and display control operations using the touch screen 130, programs related to control operations for operating the hybrid radio function (e.g., for determining the default mode), programs related to control operations for changing a mode during the operation of the hybrid radio function, data generated by operations of the respective programs, and the like.

The storage unit 150 may include at least one type of storage medium of a flash memory type memory, a hard disk type memory, a micro type memory, a card type memory (for example, a Secure Digital (SD) card an eXtream Digital (XD) card, or the like), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk. The electronic device 100 may also operate in relation to a web storage performing a storage function of the storage unit 150 on the Internet.

The interface unit 160 may serve as a passage between the electronic device 100 and all external devices connected to the electronic device 100. The interface unit 160 may transfer data transmitted or power supplied from an external device to respective elements within the electronic device 100, or may allow data within the electronic device 100 to be transmitted to the external device. For example, the interface unit 160 may include a wired/wireless headset port, an external charger port, a wired/wireless data port, a memory card port, a port for connecting a device provided with an identification module, an audio input/output port, a video input/output port, an earphone port, and the like.

The controller 170 may control an overall operation of the user device 100. For example, the controller 170 may perform a control related to voice communication, data communication, video communication, and the like. The controller 170 may process operations related to an operation of the hybrid radio function of the electronic device 100, and may be provided with a data processing module (not illustrated) for processing the operations.

When the electronic device 100 enters the hybrid radio function in response to a user request, the controller 170 may determine the preconfigured mode determination condition. In the embodiment of the present disclosure, the mode determination condition may include at least one of a presence or absence of earphones, incurring or not of an additional charge, an amount of used data, a mode usage pattern, a user's selection, and a user's configuration, in which the at least one condition is configured in advance by a user.

The controller 170 may determine the default radio mode which will be executed in response to the mode determination condition. In addition, the controller 170 may make a control such that the hybrid radio function is operated in the radio mode corresponding to the determined default radio mode. For example, when determining an analog mode as the default radio mode to be executed according to the mode determination condition, the controller 170 may operate to receive and reproduce an analog radio broadcast. Furthermore, when determining a digital mode as the default radio mode to be executed according to the mode determination condition, the controller 170 may operate to receive and reproduce a digital radio broadcast.

Moreover, while operations are being performed in the default radio mode determined when the electronic device 100 enters the hybrid radio function, the controller 170 may control radio mode switching in response to a status change (or an environment change), and may operate to receive and reproduce a radio broadcast corresponding to the switched radio mode. Namely, the controller 170 may control switching of the currently running radio mode in response to a status change of all the determination conditions while the operations are being performed in the default radio mode. In the embodiment of the present disclosure, the status change may include a change in an earphone connection status, a change in an additional charge incurring status, or a status change by a user input. According to an embodiment of the present disclosure, a user may connect earphones to the electronic device while listening to a digital radio broadcast in the digital mode. Then, when detecting the connection of the earphones while the operation is being performed in the digital mode, the controller 170 may switch the digital mode to the analog mode based on the preconfigured mode determination condition. In addition, the controller 170 may discontinue receiving the digital radio broadcast in response to the mode switching, and may operate to receive and reproduce the analog radio broadcast.

Such a detailed control operation of the controller 170 will be described in an example of an operation of the electronic device 100 and a control method thereof with reference to drawings as will be illustrated below.

The controller 170 according to the embodiment of the present disclosure may control various operations related to a general function of the electronic device 100 in addition to the aforementioned functions. For example, when a specific application is executed, the controller 170 may control an operation and displaying of a screen for the specific application. Furthermore, the controller 170 may receive input signals corresponding to various user inputs supported by a touch-based input interface (e.g., the touch screen 130), and may control an operation of functions according to the received input signals. Moreover, the controller 170 may also control data transmission/reception based on wired communication or wireless communication.

The power supply unit 180 may receive external power and internal power, and may supply power used for operation of the elements of the electronic device 100 under the control of the controller 170.

The aforementioned electronic device 100 according to the various embodiments of the present disclosure may include all devices using an Application Processor (AP), a Graphic Processing unit (GPU), and a Central Processing Unit (CPU), such as all information communication devices, all multimedia devices, and all application devices thereof, which support the functions of the present disclosure. For example, the electronic device 100 may include devices such as a tablet PC, a smart phone, a wearable device (e.g., including all types of IT (or smart) devices worn by a user, such as wearable phone, a wearable watch, a wearable computer, a wearable camera, wearable shoes, a wearable pendant, a wearable ring, a wearable bracelet, wearable glasses (goggles), and the like), a Portable Multimedia Player (PMP), a media player (e.g. an MP3 player), a portable game terminal, a Personal Digital Assistant (PDA), and the like as well as mobile communication terminals operating based on communication protocols corresponding to various communication systems. In addition, function control methods according to the various embodiments of the present disclosure may also be employed for various display devices such as a laptop computer (e.g., a notebook computer), a digital television, a Digital Signage (DS), a Large Format Display (LFD) and the like.

The various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

The recording medium may include a computer readable recording medium storing programs for performing the operation of detecting an entrance to the hybrid radio function, the operation of identifying the preconfigured mode determination condition, the operation of determining the default radio mode to be executed as a default in response to the mode determination condition, and the operation of receiving and reproducing the radio broadcast in the radio mode corresponding to the determined default radio mode.

In some cases, the embodiments described in the present specification may be implemented by the controller 170 in itself. Furthermore, according to the software implementation, the embodiments such as procedures and functions described in the present specification may also be implemented as separate software modules. The software modules may perform one or more functions and operations described in the present specification.

Figure 3:
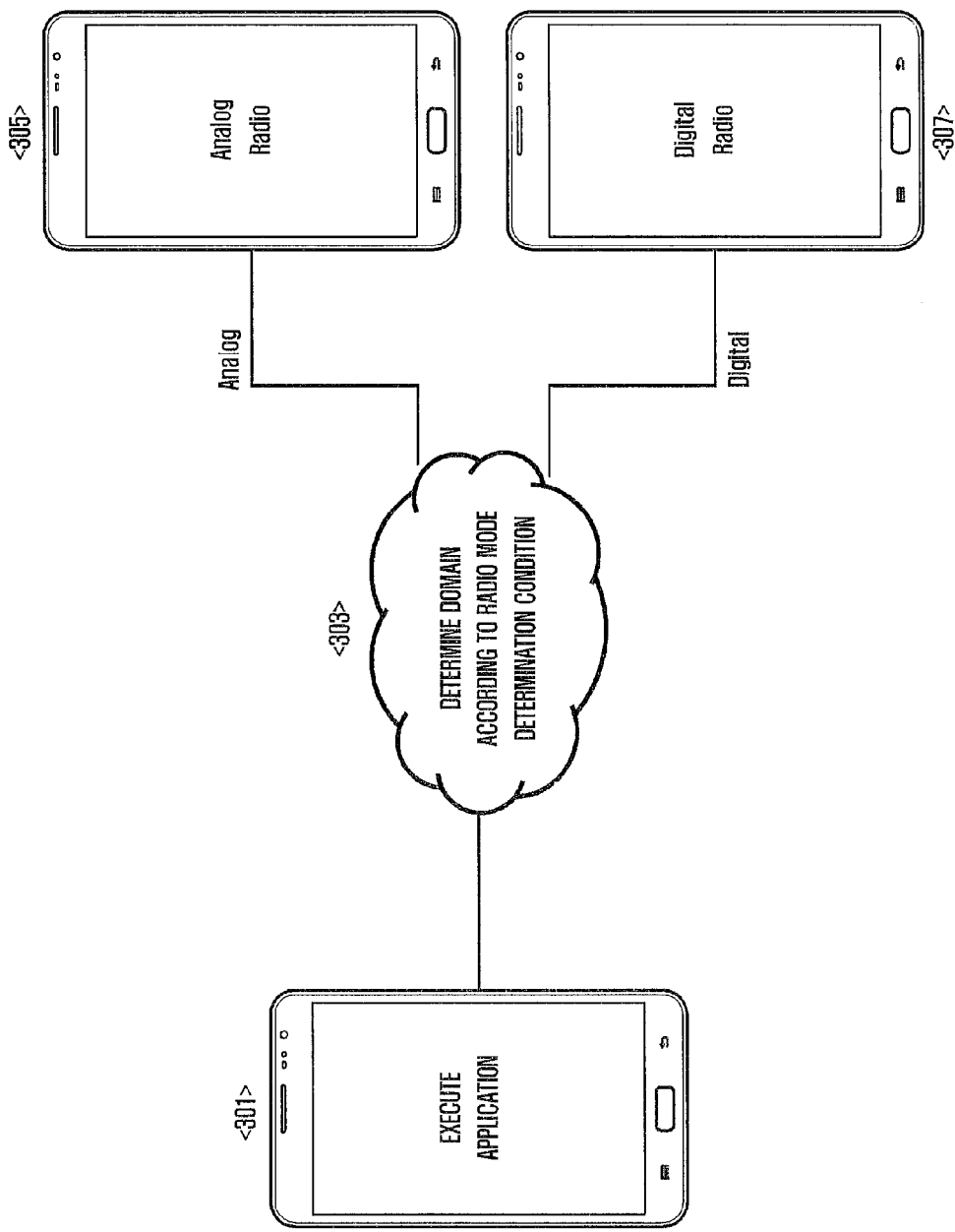
FIGS. 3 and 4 illustrate an example of an operation in which a hybrid radio function is operated in an electronic device according to an embodiment of the present disclosure.
Figure 4:
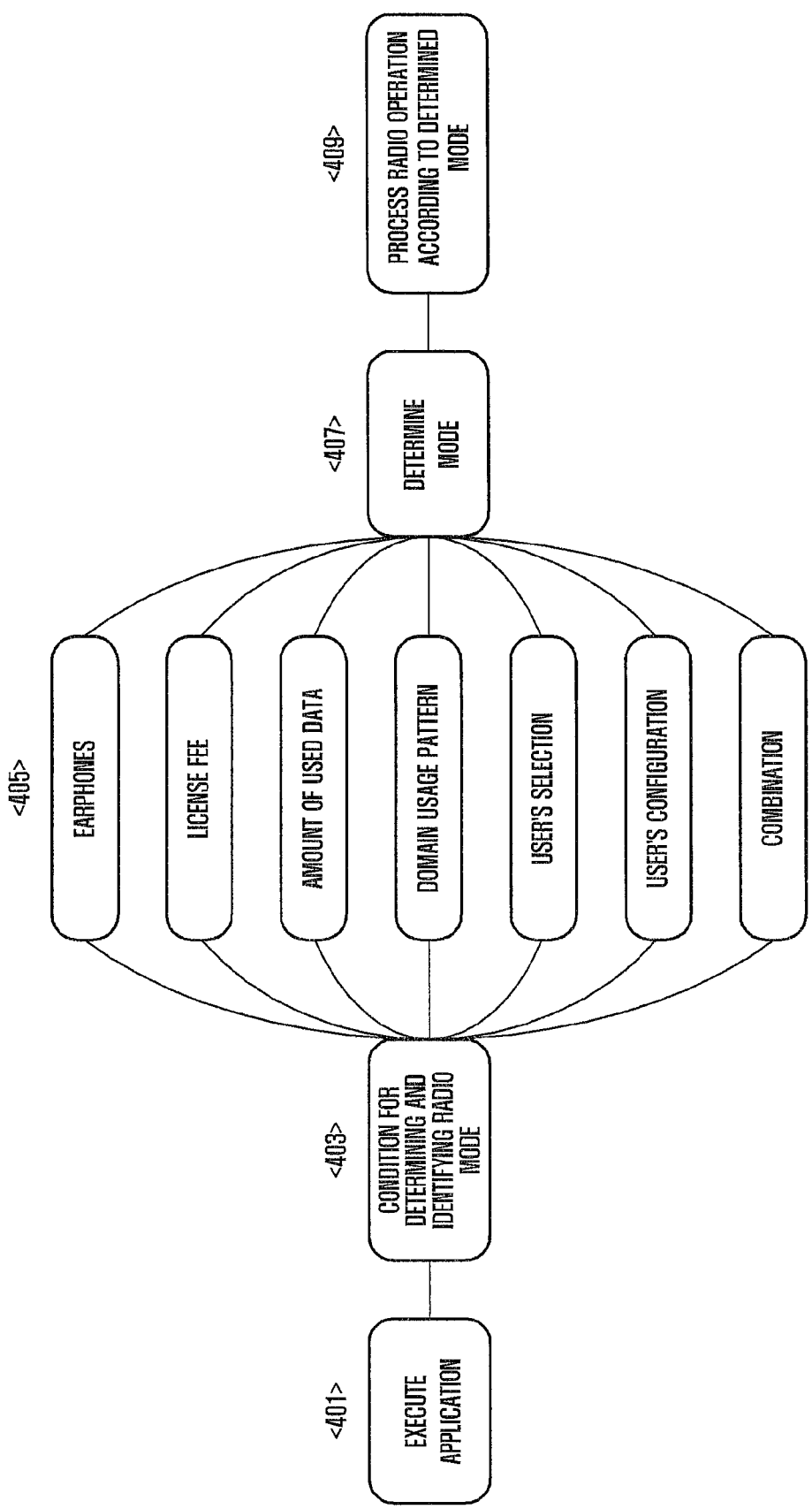

FIGS. 3 and 4 illustrate an example of an operation in which a hybrid radio function is operated in the electronic device 100 according to the embodiment of the present disclosure.

Referring to FIGS. 3 and 4, the controller 170 may execute a hybrid radio application (function) in response to a user request as in operations <301> and <401>. For example, a user may select an icon for executing the hybrid radio application on a standby screen or menu screen of the electronic device 100, and the controller 170 may execute the hybrid radio application in response to the selection of the icon.

The controller 170 may determine a default radio mode according to a radio mode determination condition as in operations <303>, <403>, <405>, and <407> in response to a user request for executing the hybrid radio application. In the embodiment of the present disclosure, as disclosed in operation <405>, the default radio mode may be determined to correspond to at least one of a presence or absence of earphones, incurring or not of an additional charge, an amount of used data, a mode usage pattern, a user's selection, a user's configuration, and a combination of at least two of the various aforementioned conditions. The operation of determining the default radio mode and the conditions for the determination of the radio mode will be described in an example of operations of the electronic device 100 and a control method thereof with reference to the drawings which will be described below.

When a user determines the default radio mode as in operation <407> with reference to one of the mode determination condition (i.e., the user characteristic) exemplified in operation <405>, the controller 170 may receive a radio broadcast of the corresponding mode according to the determined radio mode and may process operations related to the received radio broadcast as in operations <305>, <307>, and <409>.

According to an embodiment of the present disclosure, when an analog mode is determined as the default radio mode, the controller 170 may make a control such that a signal path is configured toward the analog broadcast receiving module 123 as in operation <305>. At this time, the controller 170 may also control the analog broadcast receiving module 123 to be turned on according to an On/Off status of the analog broadcast receiving module 123. The controller 170 may reproduce an analog radio broadcast received through the analog broadcast receiving module 123, and at the same time, may display a reproduction screen of the analog radio broadcast.

According to an embodiment of the present disclosure, when a digital mode is determined as the default radio mode, the controller 170 may make a control such that a signal path is configured toward the digital broadcast receiving module 121 as in operation <307>. At this time, the controller 170 may also control the digital broadcast receiving module 121 to be turned on according to an On/Off status of the digital broadcast receiving module 121. The controller 170 may reproduce a digital radio broadcast received through the digital broadcast receiving module 121, and at the same time, may display a reproduction screen of the digital radio broadcast.

Figure 5:
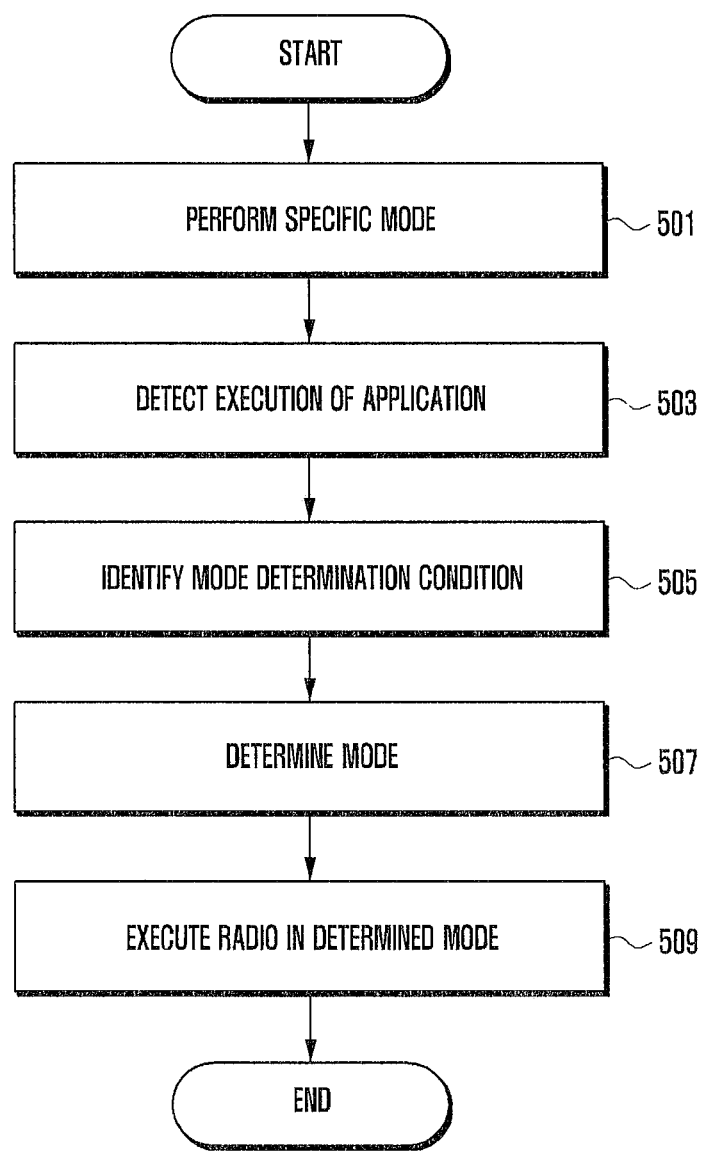
FIG. 5 is a flowchart illustrating a method of operating a hybrid radio function of an electronic device according to an embodiment of the present disclosure.

FIG. 5 is a flowchart illustrating a method of operating a hybrid radio function of the electronic device 100 according to the embodiment of the present disclosure.

Referring to FIG. 5, the controller 170 may control performance of a specific mode corresponding to a user request (step 501). For example, the controller 170 may control a standby mode while the display unit 131 of the electronic device 100 is turned off, and may control an operation mode of an application executed by a user.

When execution of a hybrid radio application is detected (step 503) while the specific mode is being performed, the controller 170 may identify the mode determination condition to determine a default radio mode in operating the hybrid radio (step 505).

The controller 170 may determine a particular radio mode depending on the mode determination condition (step 507). For example, the controller 170 may determine an analog mode or a digital mode in response to the mode determination condition.

The controller 170 may control execution of a radio in the determined mode (step 509). For example, when determining the analog mode as the default radio mode according to the mode determination condition, the controller 170 may operate to receive an analog radio broadcast and may operate to reproduce the received analog radio broadcast and display a screen related to the analog radio broadcast. Furthermore, when determining the digital mode as the default radio mode according to the mode determination condition, the controller 170 may operate to receive a digital radio broadcast and may operate to reproduce the received digital radio broadcast and display a screen related to the digital radio broadcast.

Figure 6:
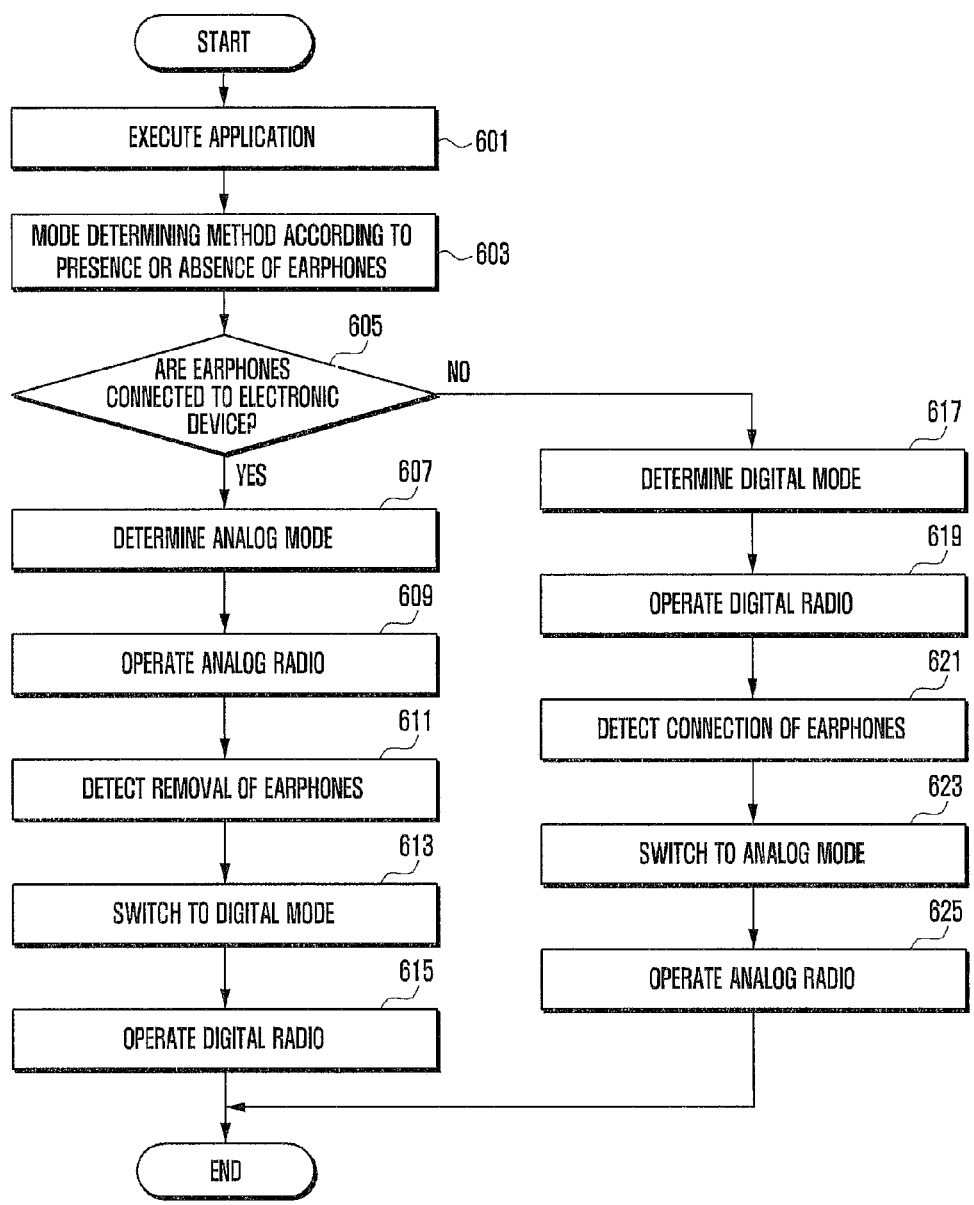
FIG. 6 is a flowchart illustrating an example of operations of determining a radio mode and performing processing depending on a presence or absence of earphones in an electronic device according to an embodiment of the present disclosure.

FIG. 6 is a flowchart illustrating an example of operations of determining a radio mode and performing processing depending on a presence or absence of earphones in the electronic device 100 according to the embodiment of the present disclosure.

Referring to FIG. 6, the controller 170 may detect execution of a hybrid radio application according to a user input (step 601). When the execution of the hybrid radio application is detected, the controller 170 may check a user characteristic (a mode determination condition) configured in order to determine a default radio mode, and it is assumed in FIG. 6 that a method of determining a mode according to a presence or absence of earphones is configured.

Earphones may be connected to the electronic device 100, and in general, may also serve as an antenna for receiving a broadcast (particularly, an analog broadcast) in the electronic device 100 supporting a digital broadcast or radio broadcast function. In the case where the earphones serve as the antenna, the electronic device 100 may need to be connected with the earphones in order to receive the analog radio broadcast. The digital radio broadcast may be provided based on the Internet, and the internet based digital radio broadcast does not need separate earphones. Accordingly, in the embodiment of the present disclosure, the electronic device 100 may determine the default radio mode using characteristics of the respective modes according to the presence or absence of the earphones when entering the hybrid radio function. That is, according to the embodiment of the present disclosure, when entering the hybrid radio function, the electronic device 100 may determine which radio mode is to be executed as a default according to whether the earphones are connected to the electronic device 100. Through an option configuration menu related to an operation of the hybrid radio function, a user may configure the analog mode as the default radio mode in a state in which the earphones are connected to the electronic device and the digital mode as the default radio mode in a state in which the earphones are not connected to the electronic device.

According to one embodiment of the present disclosure, when entering the hybrid radio function, the controller 170 may determine the analog mode in the case where the earphones are connected and the digital mode in the case where the earphones are not connected. That is, in the embodiment of the present disclosure, the electronic device may operate to receive the analog radio broadcast in the analog mode when the earphones are connected thereto, and may operate to receive the digital radio broadcast in the digital mode when the earphones are not connected thereto.

Referring back to FIG. 6, the controller 170 recognizes that the preconfigured user characteristic corresponds to a method of determining a mode according to a presence or absence of earphones (step 603), and may determine whether earphones are connected to the electronic device 100 (step 605).

When it is determined that the earphones have been connected to the electronic device (step 605—YES), the controller 170 may determine the analog mode as the default radio mode (step 607), and may control operations of receiving and reproducing the analog radio broadcast according to the determination (step 609). According to one embodiment of the present disclosure, the controller 170 may control the broadcast switching module 125 such that a signal path is configured toward the analog broadcast receiving module 123, and may operate to receive the analog radio broadcast from the analog broadcast network 10 through the analog broadcast receiving module 123 and to reproduce the received analog radio broadcast.

The controller 170 may detect removal of the earphones while receiving and reproducing the analog radio broadcast in the analog mode (step 611). When the removal of the earphones is detected, the controller 170 may switch the analog mode to the digital mode (step 613), and may control operations of receiving and reproducing the digital radio broadcast (step 615). According to one embodiment of the present disclosure, in the case where the earphones serve as the antenna, if the earphones are removed from the electronic device 100, a receiving rate of the analog radio broadcast may be deteriorated, or the analog radio broadcast may not be received. Accordingly, when the earphones are removed, the electronic device according to the present disclosure may automatically switch to the digital mode to receive the digital radio broadcast.

When it is determined that the earphones have not been connected to the electronic device (step 605—NO), the controller 170 may determine the digital mode as the default radio mode (step 617), and may control operations of receiving and reproducing the digital radio broadcast according to the determination (step 619). According to one embodiment of the present disclosure, the controller 170 may control the broadcast switching module 125 such that a signal path is configured toward the digital broadcast receiving module 121, and may operate to receive the digital radio broadcast from the digital broadcast network 20 through the digital broadcast receiving module 121 and to reproduce the received digital radio broadcast.

The controller 170 may detect a connection of earphones while receiving and reproducing the digital radio broadcast in the digital mode (step 621). When the connection of the earphones is detected, the controller 170 may switch the digital mode to the analog mode (step 623), and may control operations of receiving and reproducing the analog radio broadcast (step 625). According to one embodiment of the present disclosure, in the case where the earphones serve as the antenna, if the earphones are connected to the electronic device 100, it may be recognized according to the user characteristic that a user wants to switch to the analog radio broadcast. Accordingly, when the earphones are connected, the electronic device according to the present disclosure may automatically switch to the analog mode to receive the analog radio broadcast.

Figure 7:
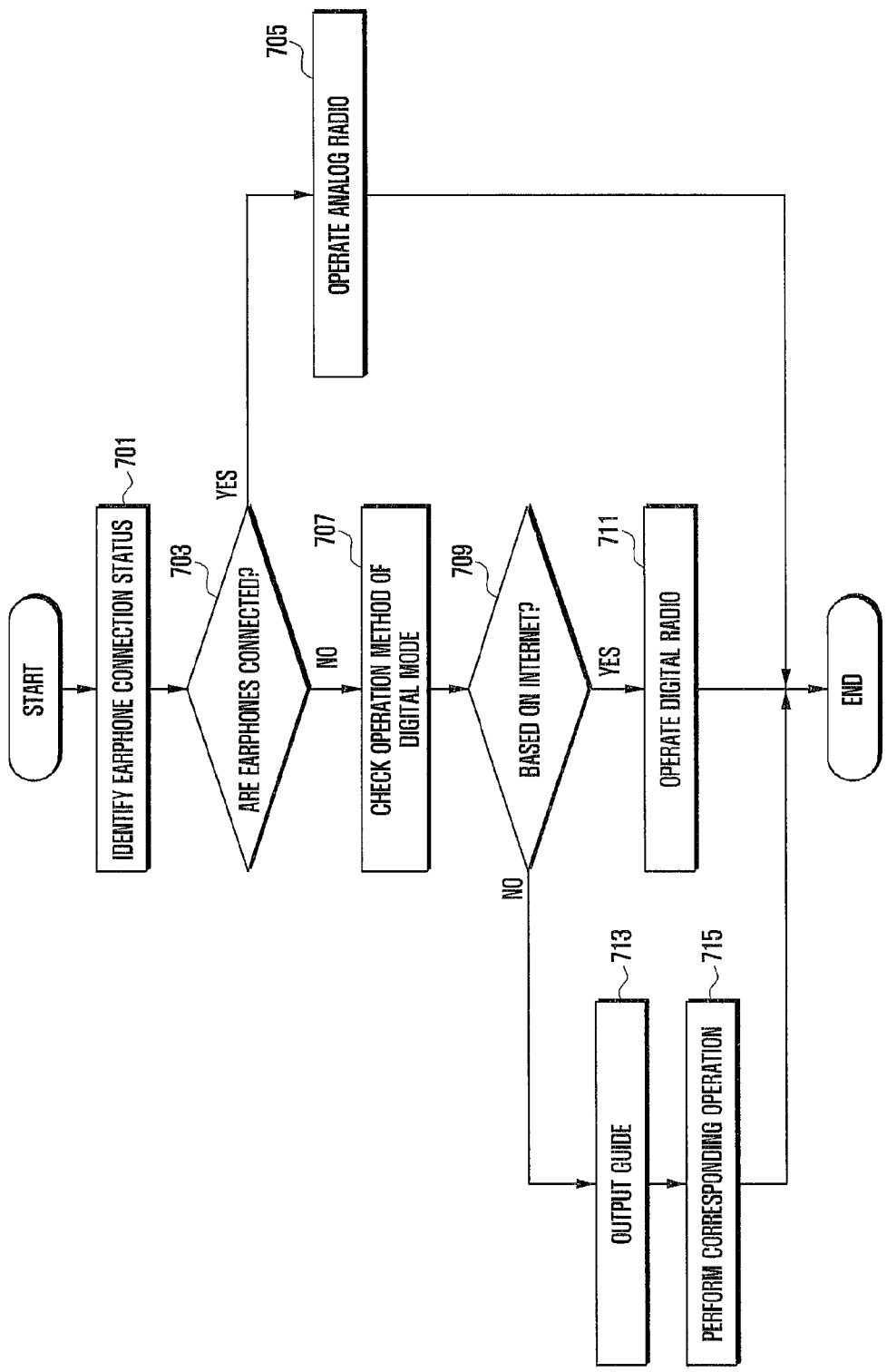
FIG. 7 is a flowchart illustrating operations of operating a hybrid radio function depending on a presence or absence of earphones in an electronic device according to an embodiment of the present disclosure.

FIG. 7 is a flowchart illustrating operations of operating a hybrid radio function depending on a presence or absence of earphones in the electronic device 100 according to the embodiment of the present disclosure.

Referring to FIG. 7, the controller 170 may identify an earphone connection status in response to execution of a hybrid radio application (step 701), and may determine whether the earphones have been connected to the electronic device (step 703).

When it is determined that the earphones have been connected to the electronic device (step 703—YES), the controller 170 may determine the analog mode as the default radio mode as described above, and may control operations of receiving and reproducing the analog radio broadcast (step 705).

When it is determined that the earphones have not been connected to the electronic device (step 703—NO), the controller 170 may determine the digital mode as the default radio mode, and may check an operation method of a radio broadcast in the digital mode (step 707). According to one embodiment of the present disclosure, the digital radio broadcast may be provided based on the Internet, in which case the digital radio broadcast may be transmitted through an internet communication network (e.g., Wi-Fi). Meanwhile, the digital radio broadcast may also be received from the digital broadcast network 20 through an antenna. Accordingly, in a case where the earphones serve as the antenna, if the digital radio broadcast is not provided based on the Internet, reception and reproduction of the digital radio broadcast may not be made. The controller 170 may check whether the digital radio broadcast desired to be received in the digital mode operates based on the Internet, and may make a control such that the digital radio broadcast operates in response to the Internet. For example, the controller 170 may determine whether a channel through which the digital radio broadcast is received has an internet address, and then, may identify an operation method of the corresponding digital radio broadcast.

When it is determined that the digital radio broadcast received in the digital mode is based on the Internet (step 709—YES), the controller 170 may control operations of receiving and reproducing the digital radio broadcast as described above (step 711).

When it is determined that the digital radio broadcast received in the digital mode is not based on the Internet (step 709—NO), the controller 170 may control an output of a preconfigured guide (step 713), and may control performance of the corresponding operation (step 715). For example, if earphones have not been connected to the electronic device (or have been removed from the electronic device) while the digital radio broadcast is not based on the Internet, the controller 170 may make a control such that the preconfigured guide (e.g., The earphones are not connected. The earphones function as the radio aerial. Connect the earphones.) is output. When earphones are connected to the electronic device by a user after the guide is output, the controller 170 may control operations of receiving and reproducing the analog radio broadcast according to switching to the analog mode, terminating the hybrid radio function in response to ending of the hybrid radio function by a user, or receiving and reproducing the internet based digital radio broadcast according to channel switching.

FIGS. 8 to 14 illustrate examples of an operation of operating a hybrid radio function according to a presence or absence of earphones in the electronic device 100 according to the embodiment of the present disclosure.

Figure 8:
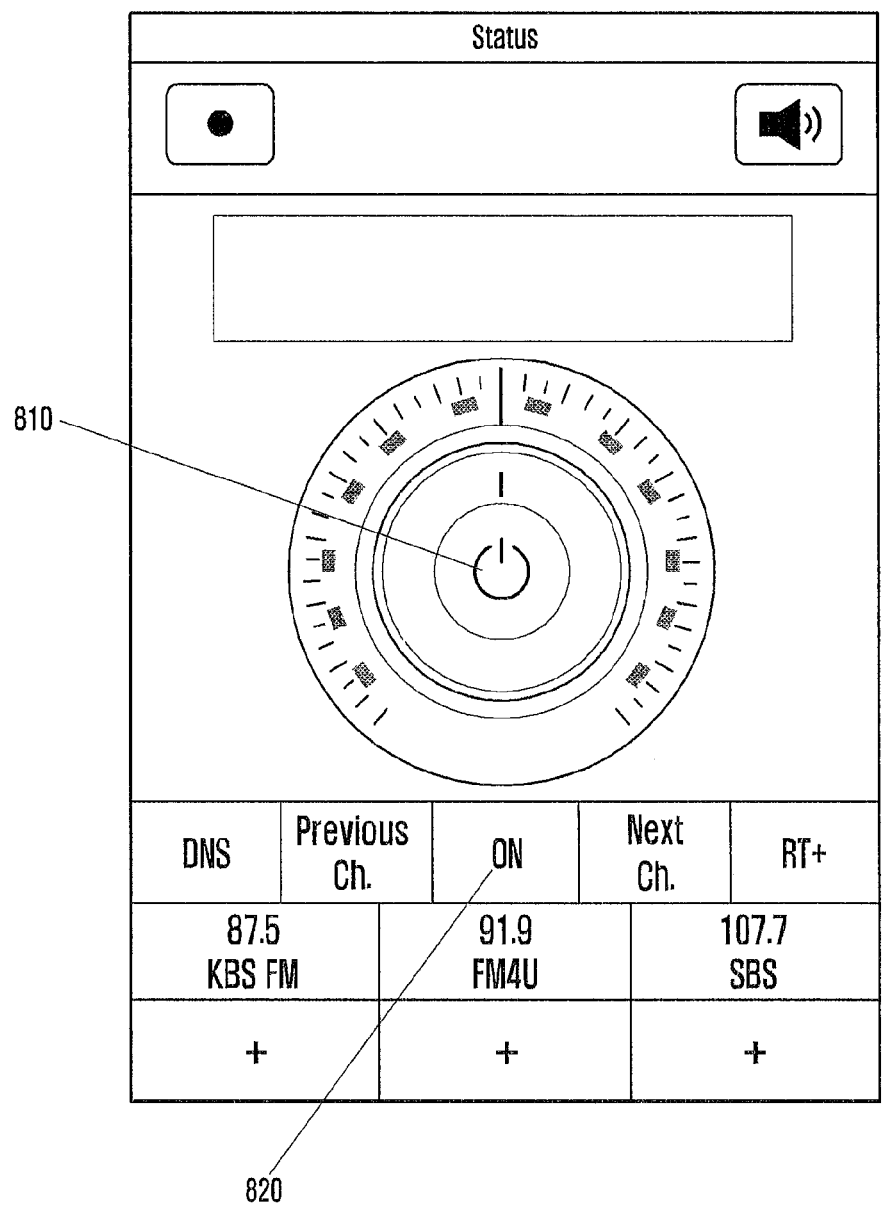
FIGS. 8 to 14 illustrate examples of an operation of operating a hybrid radio function according to a presence or absence of earphones in an electronic device according to an embodiment of the present disclosure.

Referring to FIGS. 8 to 14, FIG. 8 illustrates an example of an initial screen of the electronic device 100 in a case where a user executes a hybrid radio application or in a case where a radio broadcast of any channel is not received and reproduced while the hybrid radio application is executed. In FIG. 8, the screen may correspond to a screen in a state in which a user has received and reproduced an analog radio broadcast in the analog mode and then, ends or stops only the operations of receiving and reproducing the radio broadcast. In the state of FIG. 8, the user may select a preconfigured function button (e.g., a power button 810, a playback button 820, or the like) for reception and reproduction of the radio broadcast.

When the radio broadcast is requested to be received and restarted in the state of FIG. 8, the controller 170 may determine whether earphones are connected to the electronic device 100 as described above.

Figure 9:
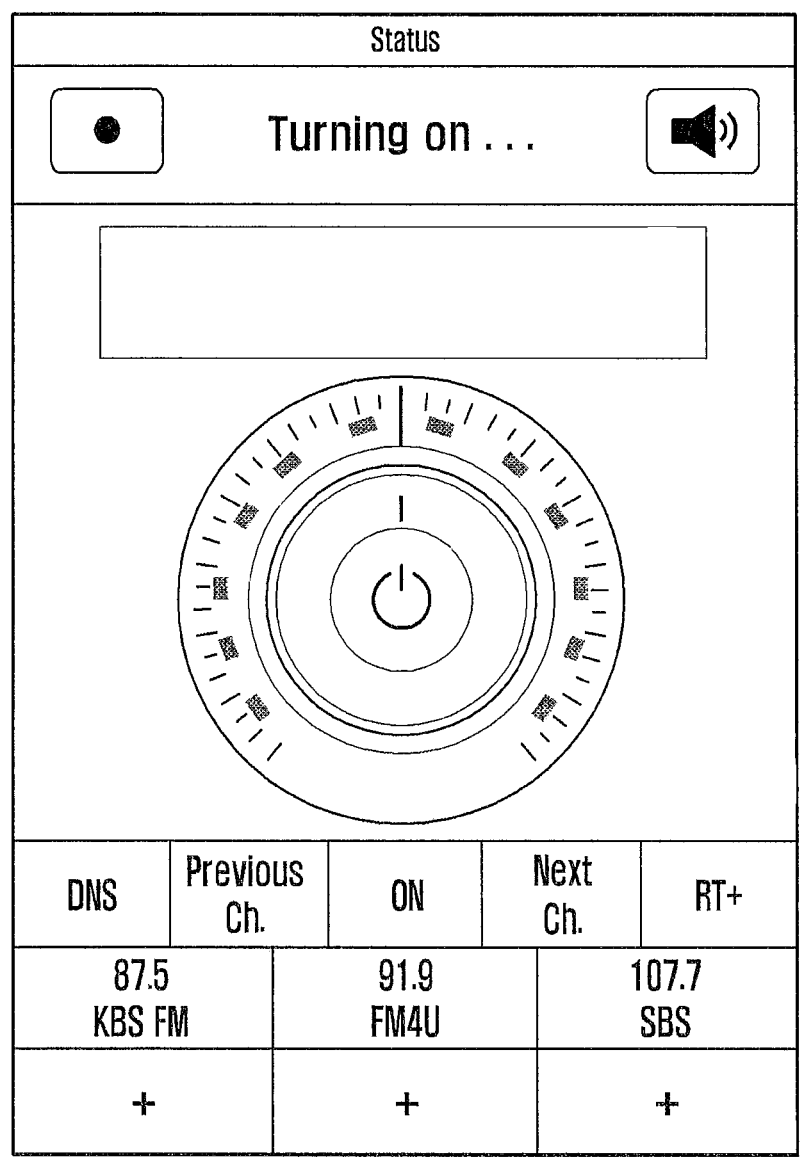
Figure 10:
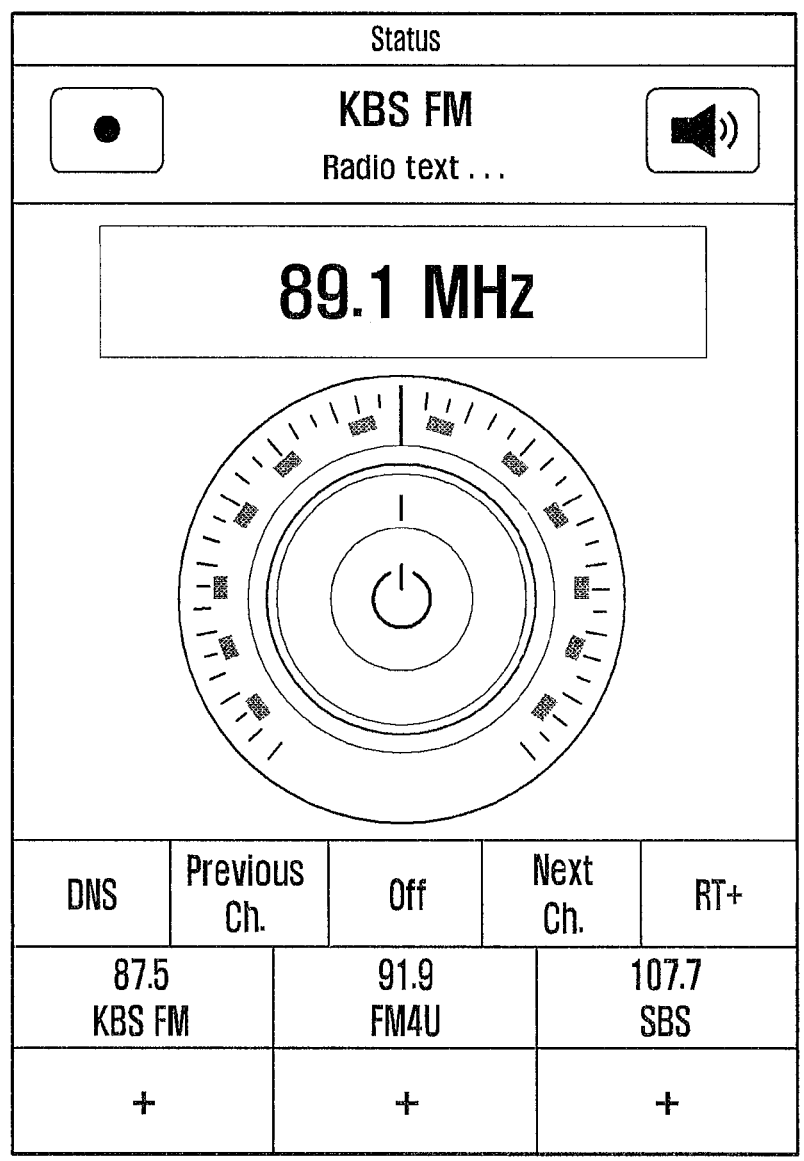

In a case where the earphones are not connected to the electronic device in the state of FIG. 8, the controller 170 may determine the analog mode as the default radio mode, and may control operations for receiving and reproducing the analog radio broadcast as illustrated in FIGS. 9 and 10. For example, when the earphones are connected to the electronic device, the controller 170 may recognize that the hybrid radio function is executed in the analog mode, and may perform related operations for receiving the analog radio broadcast of a channel according to a user's selection (or a previously executed analog broadcast channel) as illustrated in FIG. 9. In addition, the controller 170 may receive and reproduce the analog radio broadcast of a channel corresponding to a user request and make a control such that a screen related to the analog radio broadcast is displayed as illustrated in FIG. 10.

Figure 11:
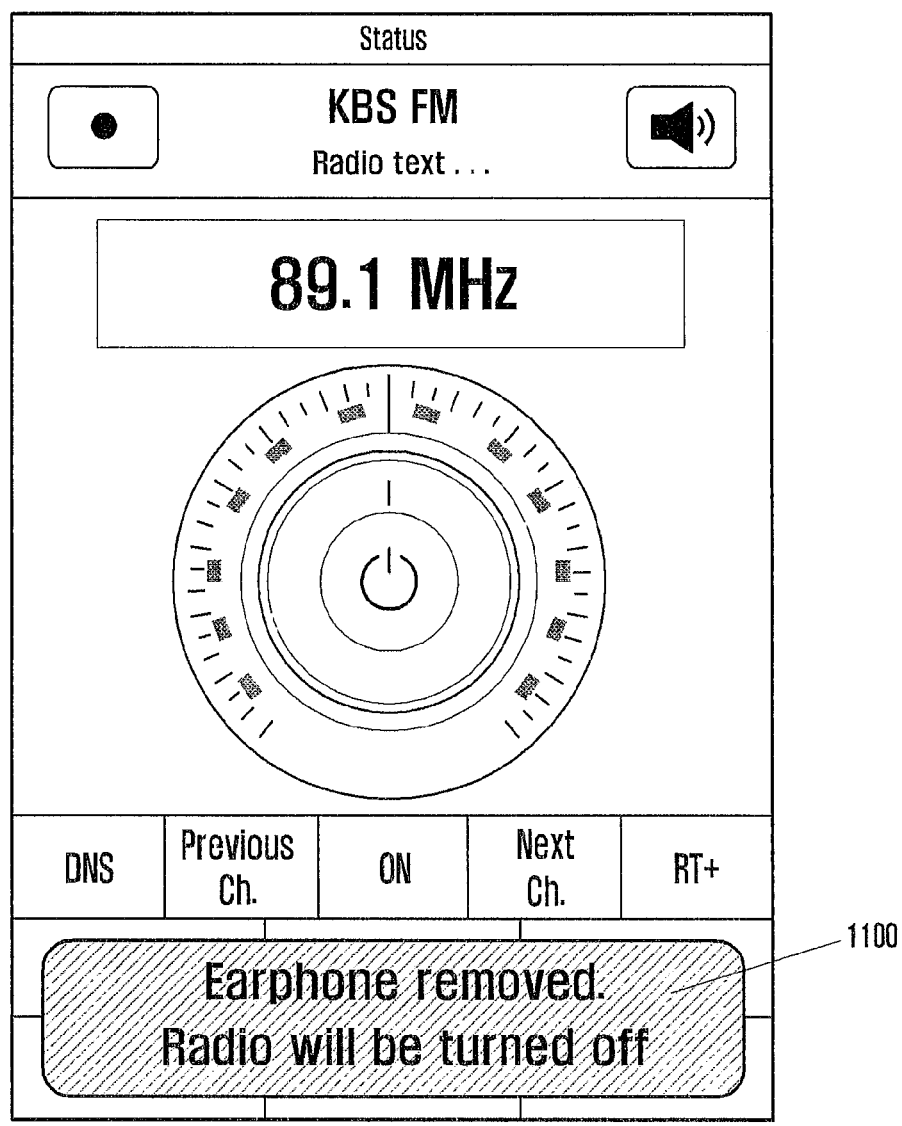

Meanwhile, if the earphones are detected to be removed when the analog radio broadcast is received and reproduced while the electronic device is operating in the analog mode, namely, the earphones are connected to the electronic device, the controller 170 may provide a guide 1100 for notifying of an error as illustrated in FIG. 11. For example, when the earphones are removed while the electronic device is operating in the analog mode according to the connection of the earphones, the controller 170 may provide the preconfigured guide (e.g., Earphones removed. Radio will be turned off.) in a popup form.

Figure 12:
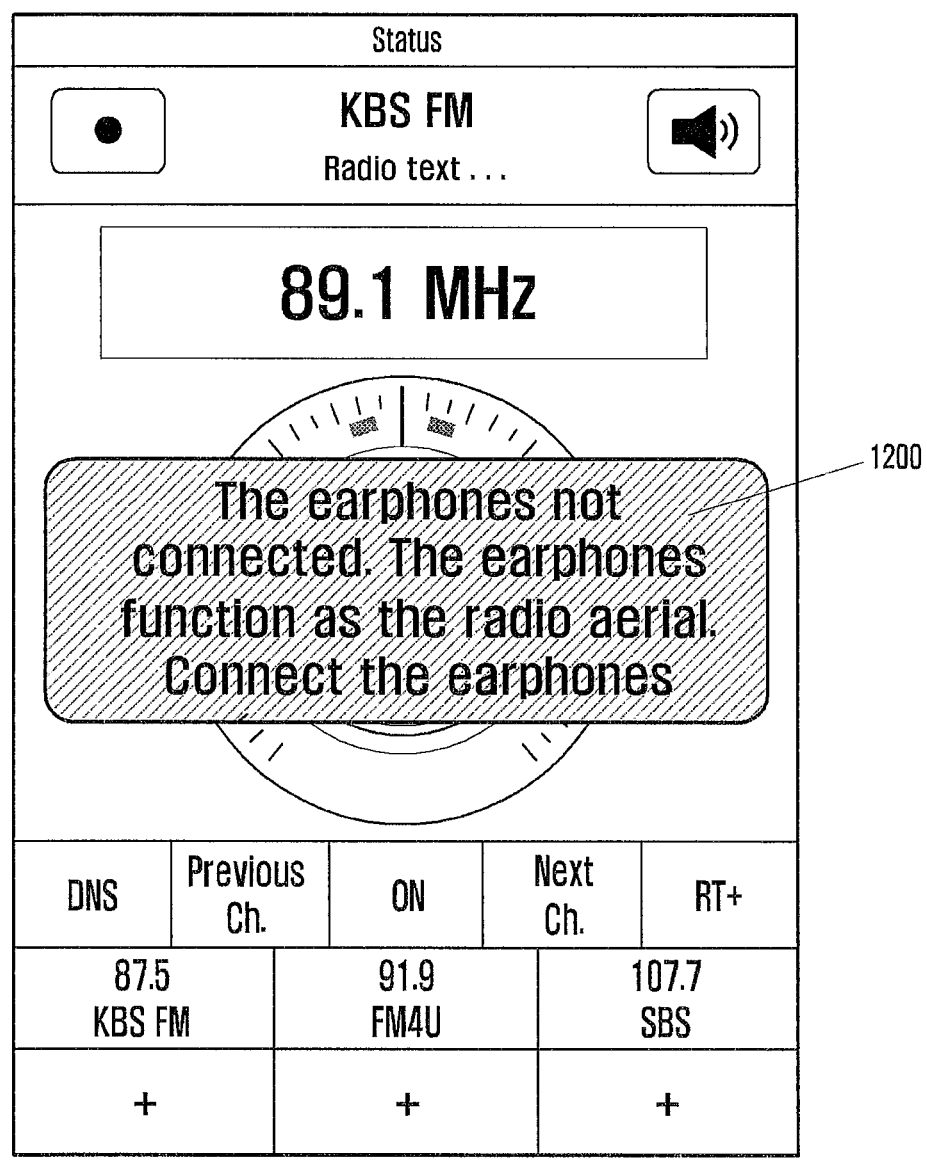

In the case where the earphones are connected to the electronic device in the state of FIG. 8, the controller 170 may determine the digital mode as the default radio mode, and may control operations for receiving and reproducing the digital radio broadcast. For example, when the earphones are not connected to the electronic device, the controller 170 may recognize that the hybrid radio function is executed in the digital mode, and may make a control such that the digital radio broadcast of a channel according to a user's selection (or a previously executed digital broadcast channel) is received and reproduced and a screen related to the digital radio broadcast is displayed as illustrated in FIGS. 12 to 14.

According to one embodiment of the present disclosure, the controller 170 may determine whether the channel of the digital radio broadcast desired to be received according to the operation in the digital mode has an internet address. When the channel of the corresponding digital radio broadcast does not have the Internet address, the controller 170 may make a control such that a preconfigured guide 1200 (e.g., The earphones are not connected. The earphones function as the radio aerial. Connect the earphones.) is output as illustrated in FIG. 12.

Figure 13:
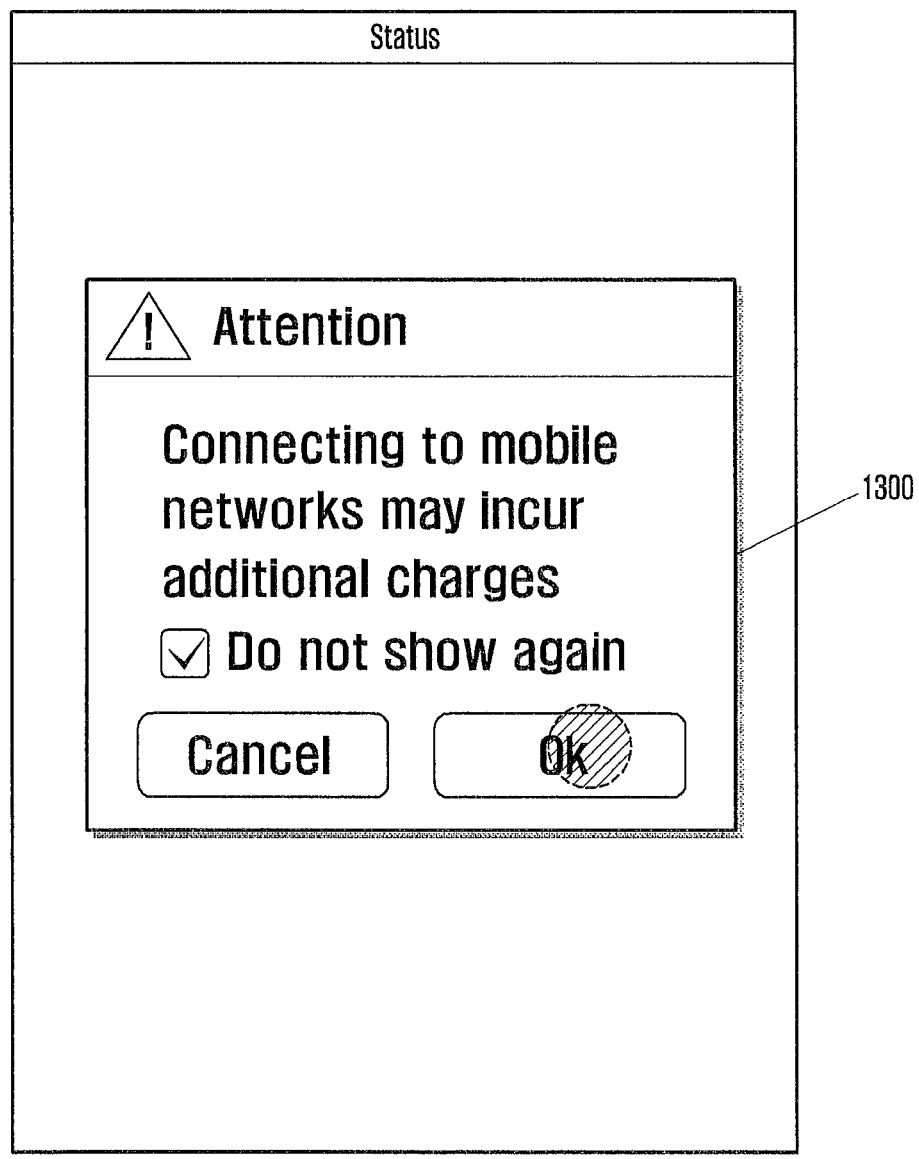
Figure 14:
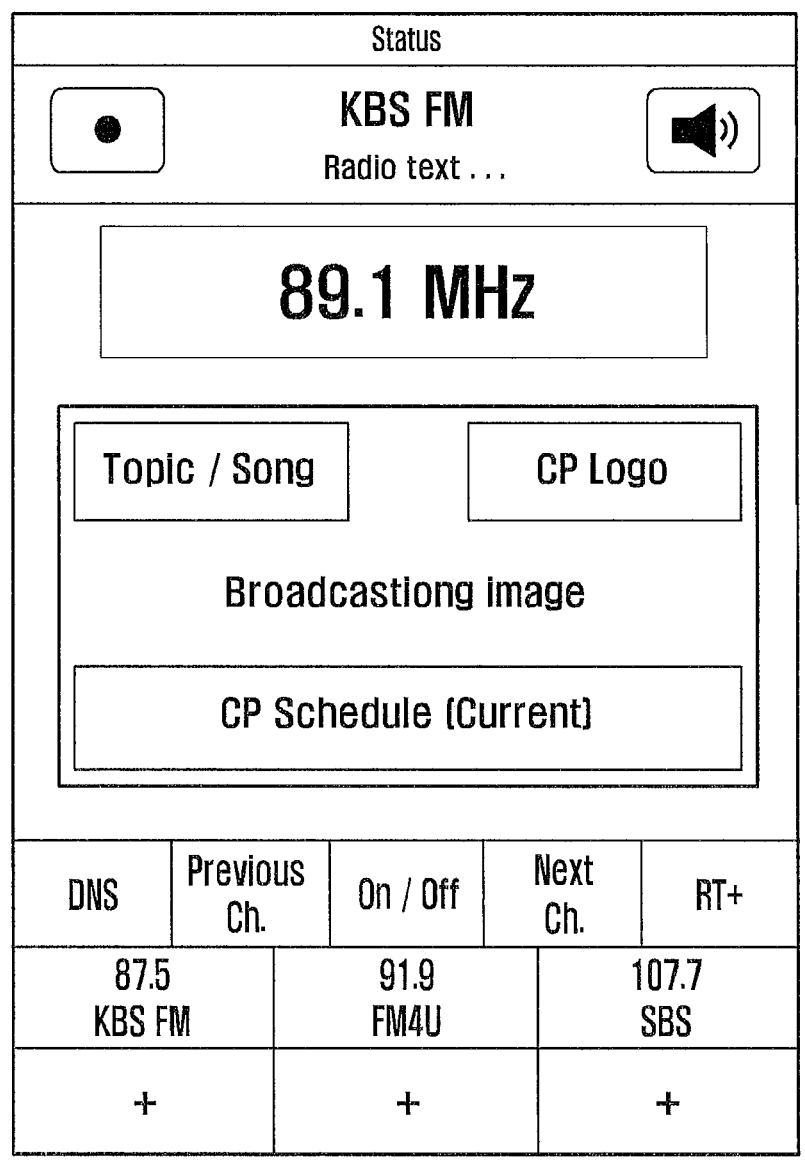

Furthermore, when the channel of the corresponding radio broadcast has the internet address, the controller 170 may provide a guide 1300, notifying that an additional charge may be incurred according to the use of the mobile communication network, in a popup form as illustrated in FIG. 13. Such an operation as illustrated in FIG. 3 may be provided according to a user's selection when the electronic device 100 receives and reproduces the digital radio broadcast through the mobile communication network without accessing the internet network such as Wi-Fi. Accordingly, the operation illustrated in FIG. 13 may be omitted when the electronic device 100 is connected to the internet network, or according to the user's selection (e.g., a selection of option "Do not show again"). In addition, as illustrated in FIG. 14, the controller 170 may receive and reproduce the digital radio broadcast of a channel corresponding to a user request, and may make a control such that a screen related to the digital radio broadcast is displayed.

Figure 15:
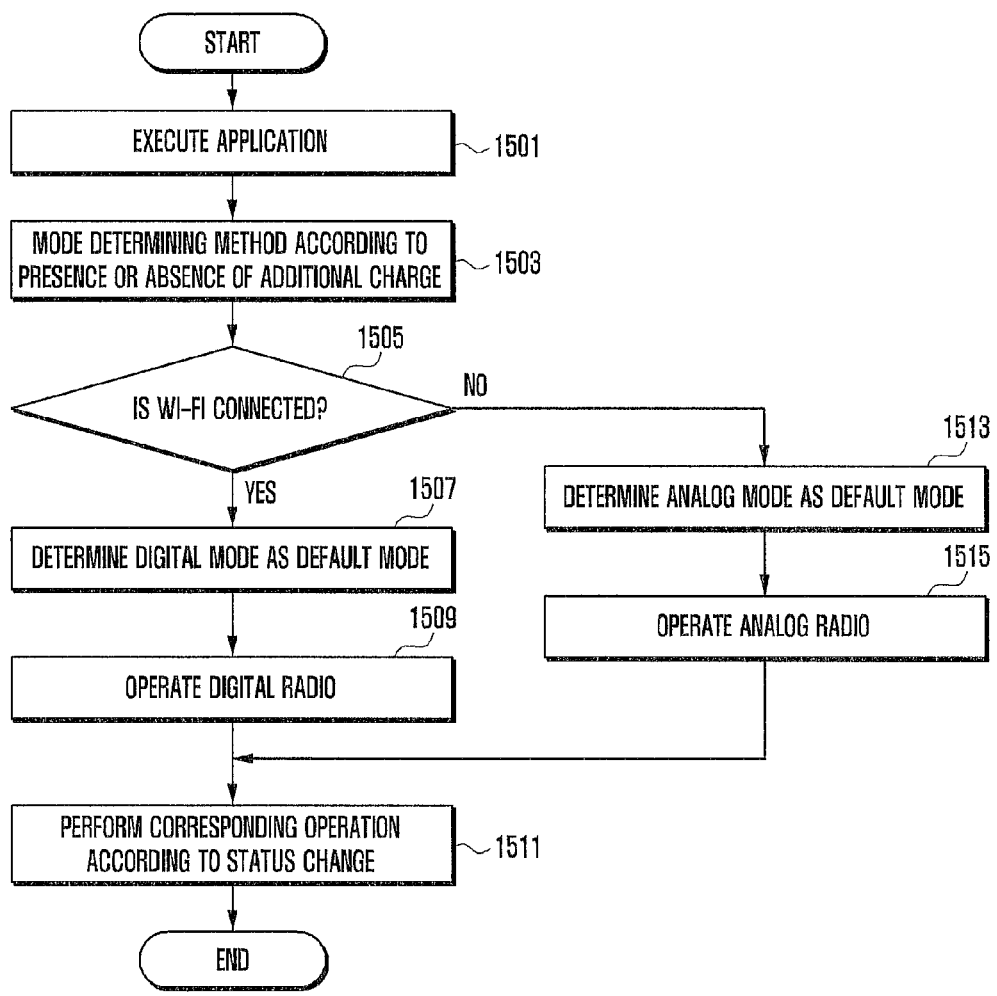
FIG. 15 is a flowchart illustrating an example of operations of determining a radio mode and performing processing depending on a presence or absence of an additional charge in an electronic device according to an embodiment of the present disclosure.

FIG. 15 is a flowchart illustrating an example of operations of determining a radio mode and performing processing depending on a presence or absence of an additional charge in the electronic device 100 according to the embodiment of the present disclosure.

Referring to FIG. 15, the controller 170 may detect execution of a hybrid radio application according to a user input (step 1501). When detecting the execution of the hybrid radio application, the controller 170 may check a user characteristic (a mode determination condition) configured in order to determine a default radio mode, and it is assumed in FIG. 15 that a method of determining a mode according to a presence or absence of an additional charge is configured.

The electronic device 100 may determine a mode that does not incur an additional charge (e.g., the analog mode) as the default radio mode when entering the hybrid radio function. Furthermore, the electronic device 100 may determine the default radio mode according to an environment in which the additional charge is not incurred (e.g., a state of being connected to the Internet network such as Wi-Fi). That is, according to the embodiment of the present disclosure, when entering the hybrid radio function, the electronic device 100 may determine which radio mode is to be executed as a default according to whether the additional charge is incurred or not. A user may configure the mode which does not incur the additional charge as the default radio mode through an option configuration menu related to an operation of the hybrid radio function. According to one embodiment of the present disclosure, the analog radio broadcast may be provided free of charge, and the digital radio broadcast may incur the additional charge when being received through a mobile communication network.

The user may configure the mode which does not incur the additional charge as the default radio mode, and the electronic device 100 may determine the analog mode which does not incur the additional charge as the default radio mode according to the aforementioned configuration when the hybrid radio function is executed or may determine the digital mode as the default radio mode according to a status in which the electronic device 100 is connected to the Internet network such as Wi-Fi.

Referring back to FIG. 15, the controller 170 recognizes that the preconfigured user characteristic corresponds to a method of determining a mode according to a presence or absence of an additional charge (step 1503), and may determine a Wi-Fi connection status of the electronic device 100 (step 1505).

When it is determined that Wi-Fi has been connected to the electronic device (step 1505—YES), the controller 170 may determine the digital mode as the default radio mode (step 1507), and may control operations of receiving and reproducing the digital radio broadcast according to the determination of the digital mode (step 1509).

When it is determined that Wi-Fi has not been connected to the electronic device (step 1505—NO), the controller 170 may determine the analog mode which does not incur an additional charge as the default radio mode (step 1513), and may control operations of receiving and reproducing the analog radio broadcast according to the determination of the analog mode.

Meanwhile, the controller 170 may make a control such that corresponding operations are performed to correspond to a status change (or an environment change) during the reception and reproduction of the analog radio broadcast in the analog mode or the analog radio broadcast in the digital mode (step 1511).

For example, when Wi-Fi is connected to the electronic device during the operations in the analog mode, the controller 170 may switch from the analog mode to the digital mode, and may control operations of receiving and reproducing the digital radio broadcast. On the other hand, when Wi-Fi is connected to the electronic device during the operations in the digital mode, the controller 170 may switch from the digital mode to the analog mode, and may control operations of receiving and reproducing the analog radio broadcast.

Figure 16:
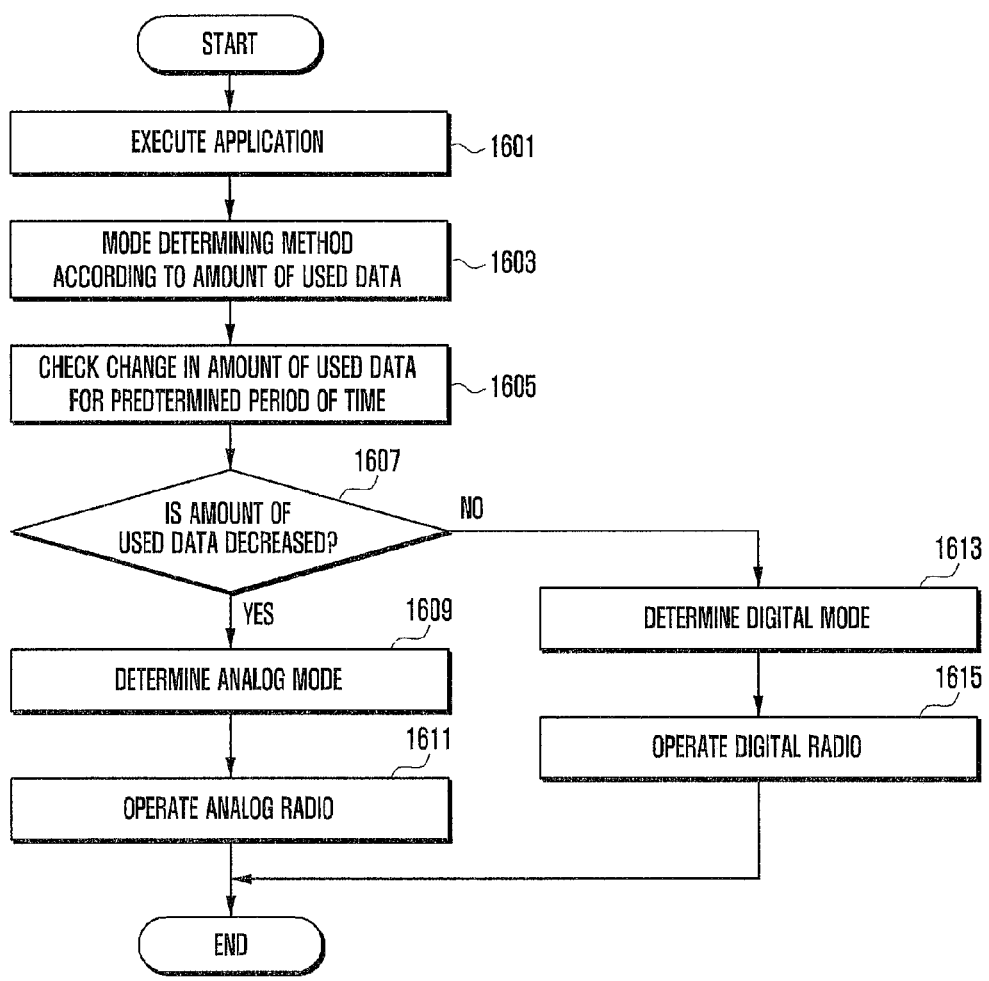
FIG. 16 is a flowchart illustrating an example of operations of determining a radio mode and performing processing depending on a change in an amount of used data in an electronic device according to an embodiment of the present disclosure.

FIG. 16 is a flowchart illustrating an example of operations of determining a radio mode and performing processing depending on a change in amount of used data in the electronic device 100 according to the embodiment of the present disclosure.

Referring to FIG. 16, the controller 170 may detect execution of a hybrid radio application according to a user input (step 1601). When detecting the execution of the hybrid radio application, the controller 170 may check a user characteristic (a mode determination condition) configured in order to determine a default radio mode, and it is assumed in FIG. 16 that a method of determining a mode according to a change in amount of used data is configured.

When entering the hybrid radio function, the electronic device 100 may profile an amount of used data for a predetermined period of time to determine the default radio mode based on a data usage pattern of a user. For example, the electronic device 100 may check a change in amount of data used by the user for the predetermined period of time. In addition, in a case where the amount of used data is on a downward trend, the electronic device 100 may determine that the analog mode is more likely to be preferred to execute the analog mode as the default radio mode. On the other hand, in a case where the amount of used data is on an upward trend, the electronic device 100 may determine that the digital mode is more likely to be preferred to execute the digital mode as the default radio mode.

Referring back to FIG. 16, the controller 170 may recognize that the preconfigured user characteristic corresponds to a method of determining a mode according to the change in an amount of used data (step 1603), check the change in the amount of used data for a predetermined period of time (step 1605), and determine whether the amount of used data is on a downward or upward trend (step 1607).

When it is determined that the amount of used data has been decreased for the predetermined period of time (step 1607—YES), the controller 170 may determine the analog mode as the default radio mode (step 1609), and may control operations of receiving and reproducing the analog radio broadcast according to the determination of the analog mode (step 1611).

When it is determined that the amount of used data has been increased for the predetermined period of time (step 1607—NO), the controller 170 may determine the digital mode as the default radio mode (step 1613), and may control operations of receiving and reproducing the digital radio broadcast according to the determination of the digital mode (step 1615).

Figure 17:
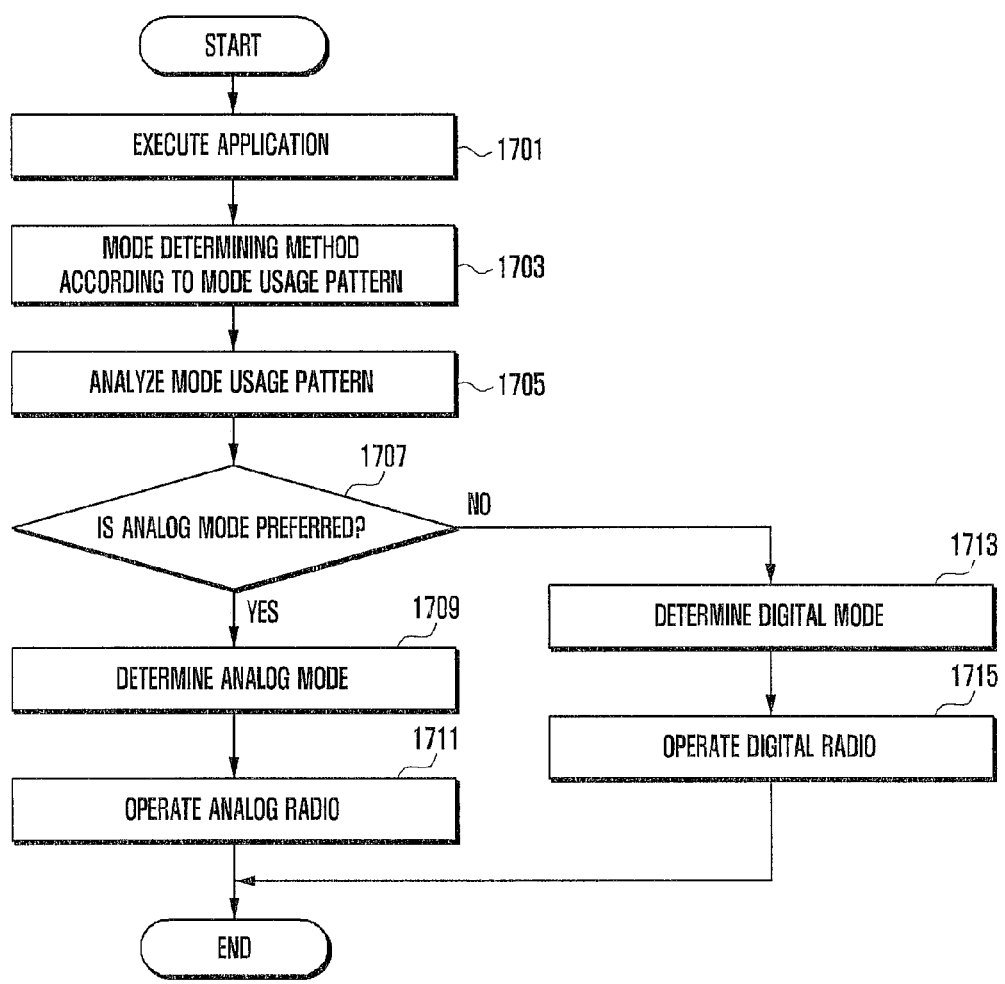
FIG. 17 is a flowchart illustrating an example of operations of determining a radio mode and performing processing depending on a mode usage pattern in an electronic device according to an embodiment of the present disclosure.

FIG. 17 is a flowchart illustrating an example of operations for determining a radio mode and performing processing depending on a mode usage pattern in the electronic device 100 according to the embodiment of the present disclosure.

Referring to FIG. 17, the controller 170 may detect execution of a hybrid radio application according to a user input (step 1707). When detecting the execution of the hybrid radio application, the controller 170 may check a user characteristic (a mode determination condition) configured in order to determine a default radio mode, and it is assumed in FIG. 17 that a method of determining a mode according to a mode usage pattern is configured.

When entering the hybrid radio function, the electronic device 100 may determine a preferred radio mode, used by a user while the hybrid radio functions is executed for a predetermined period of time, as the default radio mode. Namely, the electronic device 100 may analyze the pattern in which the user has used radio modes for the predetermined period of time, and may determine the radio mode preferred by the user for the hybrid radio function as the default radio mode.

For example, the analog radio broadcast of the analog mode may be completely free of charge, and thus, a user sensitive to an additional charge is more likely to use the analog mode. Furthermore, the digital radio broadcast of the digital mode may have a better sound quality and may also be provided with various pieces of additional content as compared with the analog radio broadcast. Thus, a user not sensitive to the additional charge is more likely to use the digital mode. The electronic device 100 may accordingly predict the preferred radio mode of the user, which will be executed as a default, by analyzing the mode usage pattern of the user for the predetermined period of time.

According to one embodiment of the present disclosure, the electronic device 100 may check using rates of the respective radio modes for the last week with respect to a current time. When the analog mode is preferred to the digital mode, the electronic device 100 may recognize that the user is sensitive to the additional charge according to the used data. Accordingly, the electronic device 100 may determine that the analog mode is more likely to be used, and then, may execute the analog mode as the default radio mode. On the other hand, when the digital mode is preferred to the analog mode, the electronic device 100 may recognize that the user is not sensitive to the additional charge according to the used data. Accordingly, the electronic device 100 may determine that the digital mode is more likely to be used, and then, may execute the digital mode as the default radio mode.

Referring back to FIG. 17, the controller 170 may recognize that the preconfigured user characteristic corresponds to a method of determining a mode according to the mode usage pattern (step 1703), analyze the mode usage pattern for a predetermined period of time (step 1705), and determine whether the preferred radio mode, which the user has frequently used for the predetermined period of time, is the analog mode or the digital mode (step 1707). Namely, the controller 170 may determine the default radio mode by analyzing which of the analog and digital modes has been preferred.

When it is determined that the preferred radio mode used for the predetermined period of time is the analog mode (step 1707—YES), the controller 170 may determine the analog mode as the default radio mode (step 1709), and may control operations of receiving and reproducing the analog radio broadcast according to the determination of the analog mode (step 1711).

When it is determined that the preferred radio mode used for the predetermined period of time is the digital mode (step 1707—NO), the controller 170 may determine the digital mode as the default radio mode (step 1713), and may control operations of receiving and reproducing the digital radio broadcast according to the determination of the digital mode (step 1715).

Figure 18:
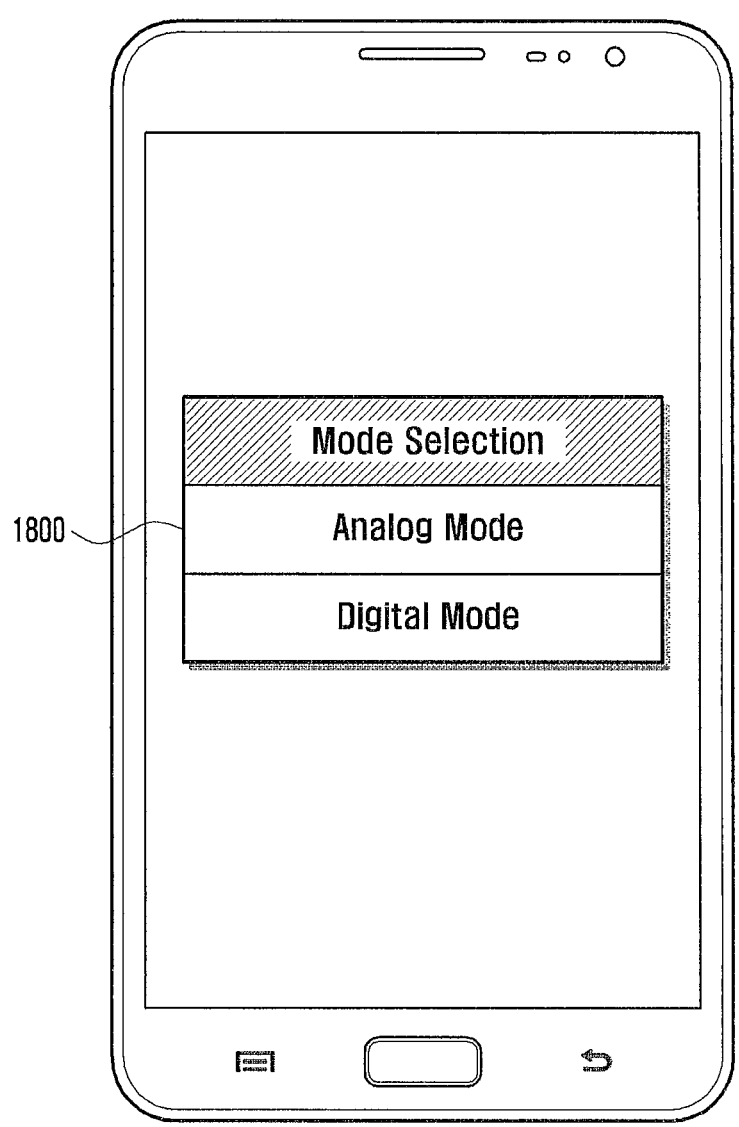
FIG. 18 illustrates an example of operations of determining a radio mode and performing processing depending on a user's selection in an electronic device according to an embodiment of the present disclosure.

FIG. 18 illustrates an example of operations of determining a radio mode and performing processing depending on a user's selection in the electronic device 100 according to the embodiment of the present disclosure.

Referring to FIG. 18, when detecting execution of a hybrid radio application according to a user input, the controller 170 may check a user characteristic (a mode determination condition) configured in order to determine a default radio mode, and it is assumed in FIG. 18 that a method of determining a mode according to a user's selection is configured.

As illustrated in FIG. 18, when entering the hybrid radio function, the electronic device 100 may display a mode selection menu 1800 for selecting the default radio mode to the user. Namely, when executing the hybrid radio function, the electronic device 100 may invest the user with a right of selection for the radio mode through the mode selection menu 1800, and the user may select the radio mode (e.g., the analog mode or the digital mode) which the user desires to execute as a default through the mode selection menu 1800. Then, the electronic device 100 may determine the selected radio mode as the default radio mode in response to the user's selection, and may control operations of receiving and reproducing the radio broadcast corresponding to the determined radio mode.

Figure 19:
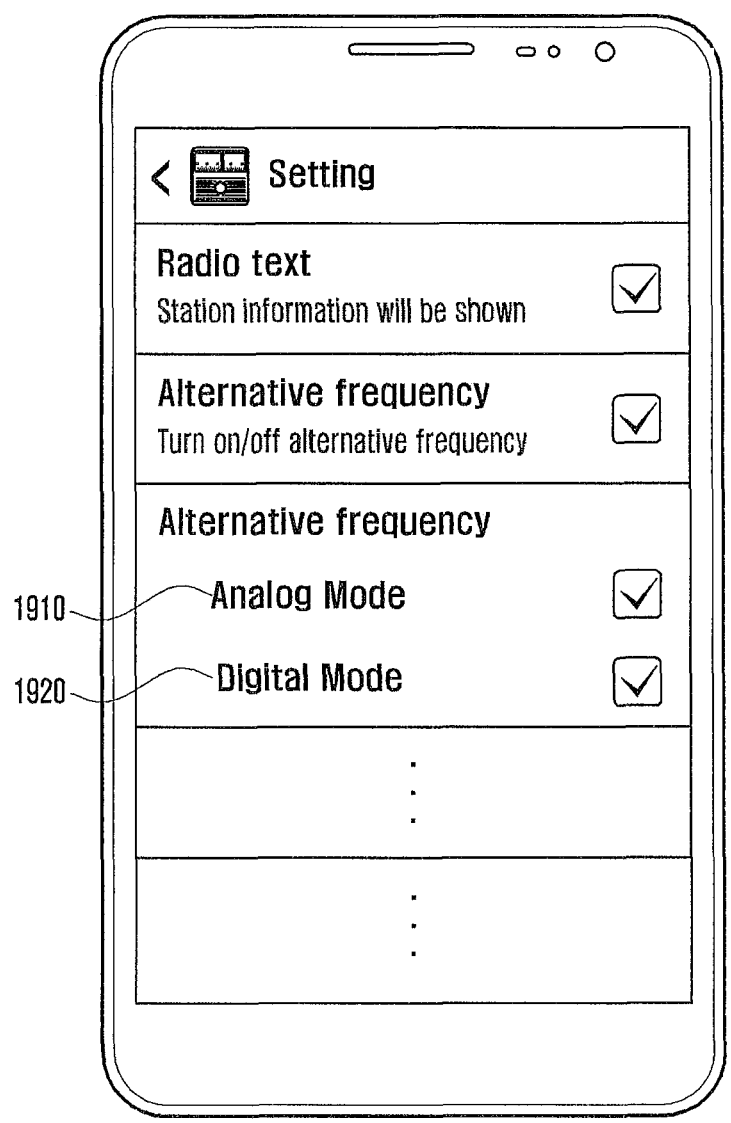
FIG. 19 illustrates an example of operations of determining a radio mode and performing processing depending on a user's configuration in an electronic device according to an embodiment of the present disclosure.

FIG. 19 illustrates describing an example of operations of determining a radio mode and performing processing depending on a user's configuration in the electronic device 100 according to the embodiment of the present disclosure.

Referring to FIG. 19, when detecting execution of a hybrid radio application according to a user input, the controller 170 may check a user characteristic (a mode determination condition) configured in order to determine a default radio mode, and it is assumed in FIG. 19 that a method of determining a mode according to a user's configuration is configured.

As illustrated in FIG. 19, when entering the hybrid radio function, the electronic device 100 may provide, to a user, a configuration menu through which the user may configure various pieces of information related to the operation of the hybrid radio function (particularly, may configure the default radio mode). Namely, when executing the hybrid radio function, the electronic device 100 may display the configuration menu through which the various pieces of information related to the operation of the hybrid radio function can be configured, and the user may allow the radio mode (e.g., an analog mode 1910 or a digital mode 1920) which the user desires to execute as the default to be selectively executed through the configuration menu.

When executing the hybrid radio function, the electronic device 100 selectively executes the analog mode 1910 and the digital mode 1920 according to the radio mode configured by the user through the configuration menu. For example, the electronic device 100 may execute the analog mode as the default when the analog mode 1910 is configured as the default mode through the configuration menu and the digital mode as the default when the digital mode 1920 is configured as the default mode through the configuration menu. Furthermore, when both the analog mode 1910 and the digital mode 1920 (i.e., the plurality of modes) are configured as the default mode through the configuration menu, the electronic device 100 may perform an operation of determining any one radio mode as the default radio mode in view of the various user characteristics as described above, and may control operations of receiving and reproducing the radio broadcast according to the determined default radio mode.

Meanwhile, according to various embodiments of the present disclosure, the respective modules may be configured with software, firmware, hardware, or combinations thereof. Furthermore, some or all modules may be configured within one entity, in which case the function of the corresponding module may be identically performed. Moreover, according to various embodiments of the present disclosure, respective operations may be executed sequentially, repeatedly, or in parallel. In addition, some operations may be omitted or may be executed while other operations are added thereto.

The various embodiments of the present disclosure as described above may be implemented in the form of a program instruction that can be performed through various computers, and may be recorded in a computer readable recording medium. The computer readable recording medium may include a program command, a data file, and a data structure independently or in combination. The program instruction recorded in the recording medium is specially designed and constructed for the present disclosure, but may be well known to and may be used by those skilled in the art of computer software.

The computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. Further, the program command may include a high level language executed by a computer by using an interpreter as well as a machine language code made by a compiler. The hardware device may be configured to operate as one or more software modules in order to perform operations of the present disclosure, and vice versa.

Meanwhile, exemplary embodiments of the present disclosure shown and described in this specification and the drawings correspond to specific examples presented in order to easily explain technical contents of the present disclosure, and to help comprehension of the present disclosure, but are not intended to limit the scope of the present disclosure. Therefore, it should be construed that all modifications or modified forms drawn by the technical idea of the present disclosure in addition to the embodiments disclosed herein are included in the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a hybrid radio in an electronic device, the method comprising:
   detecting an input for entering a hybrid radio function comprising an analog mode and a digital mode;
   determining one of the analog mode and the digital mode to be executed as a default radio mode in response to a preconfigured mode determination condition; and
   receiving and reproducing a radio broadcast in a radio mode corresponding to the determined mode,
   wherein the preconfigured mode determination condition comprises at least one of connection status of earphones, an amount of used data, and a mode usage pattern,
   wherein the determining of the default radio mode further comprises:
      determining an analog mode as the default radio mode when the earphones are connected to the electronic device; and
      determining a digital mode as the default radio mode when the earphones are not connected to the electronic device.

2. The method of claim 1, wherein determining the default radio mode comprises:
   determining the default radio mode according to a change in an amount of used data.

3. The method of claim 2, wherein determining the default radio mode further comprises:
   identifying the change in the amount of used data for a predetermined period of time;
   determining an analog mode as the default radio mode when the amount of used data decreases; and
   determining a digital mode as the default radio mode when the amount of used data increases.

4. The method of claim 1, wherein determining the default radio mode comprises:
   determining the default radio mode according to a mode usage pattern.

5. The method of claim 4, wherein determining the default radio mode further comprises:
   analyzing the mode usage pattern for a predetermined period of time;
   determining an analog mode as the default radio mode when a preferred radio mode according to the mode usage pattern is the analog mode; and
   determining a digital mode as the default radio mode when the preferred radio mode according to the mode usage pattern is the digital mode.

6. The method of claim 1, further comprising:
   switching a currently running radio mode in response to a status change of the mode determination condition during an operation in the default radio mode.

7. The method of claim 6, wherein the status change comprises a change in an earphone connection status, a change in an additional charge incurring status, or a status change by a user input.

8. An electronic device comprising:
a broadcast receiving module configured to support a hybrid radio function comprising analog mode and digital mode;
a touch screen configured to receive a user input for an entrance of the electronic device to a hybrid radio function and display a screen corresponding to a default radio mode when the electronic device enters the hybrid radio function; and
a controller configured to determine one of the analog mode and the digital mode to be executed as a default in response to a preconfigured mode determination condition when the electronic device enters the hybrid radio function and control an operation of the hybrid radio function in a radio mode corresponding to the determined mode,
wherein the preconfigured mode determination condition comprises at least one of connection status of earphones, an amount of used data, and a mode usage pattern, and
wherein the controller is configured to determine an analog mode as the default radio mode when the earphones are connected to the electronic device, and determine a digital mode as the default radio mode when the earphones are not connected to the electronic device.

9. The electronic device of claim 8, further comprising:
a storage unit configured to store the preconfigured mode determination condition configured by a user.

10. The electronic device of claim 8, further comprising:
a broadcast receiving module configured to support the hybrid radio function, wherein the broadcast receiving module comprises:
a digital broadcast receiving module configured to receive a digital radio broadcast according to a digital mode;
an analog broadcast receiving module configured to receive an analog radio broadcast according to an analog mode; and
a broadcast switching module configured to switch between the digital mode and the analog mode.

11. The electronic device of claim 8, wherein the controller is configured to control switching between radio modes in response to a status change of the mode determination condition during an operation in the default radio mode determined when the electronic device enters the hybrid radio function.

12. The electronic device of claim 11, wherein the status change comprises a change in an earphone connection status, a change in an additional charge incurring status, or a status change by a user input.

13. The electronic device of claim 8, wherein the controller is configured to determine a digital mode or an analog mode as the default radio mode in response to the preconfigured mode determination condition.

14. A non-transitory computer readable recording medium that stores one or more programs, that when executed cause an electronic device to:
detect an input for entering a hybrid radio function comprising analog mode and digital mode;
determine one of the analog mode and the digital mode to be executed as a default in response to a preconfigured mode determination condition, and
receive and reproduce a radio broadcast in a radio mode corresponding to the determined mode, wherein the preconfigured mode determination condition comprises at least one of connection status of earphones, an amount of used data, and a mode usage pattern,
wherein the determining of the default radio mode further comprises:
determining an analog mode as the default radio mode when the earphones are connected to the electronic device; and
determining a digital mode as the default radio mode when the earphones are not connected to the electronic device.

* * * * *